US011638255B2

(12) United States Patent
Zhou et al.

(10) Patent No.: US 11,638,255 B2
(45) Date of Patent: Apr. 25, 2023

(54) TECHNIQUES UPDATING BEAMS IN PERIODIC TRANSMISSIONS

(71) Applicant: QUALCOMM Incorporated, San Diego, CA (US)

(72) Inventors: Yan Zhou, San Diego, CA (US); Tao Luo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/880,232

(22) Filed: May 21, 2020

(65) Prior Publication Data

US 2020/0404639 A1    Dec. 24, 2020

Related U.S. Application Data

(60) Provisional application No. 62/865,139, filed on Jun. 21, 2019.

(51) Int. Cl.
*H04W 72/04* (2009.01)
*H04L 1/16* (2006.01)
(Continued)

(52) U.S. Cl.
CPC ......... *H04W 72/046* (2013.01); *H04L 1/1671* (2013.01); *H04L 1/1896* (2013.01);
(Continued)

(58) Field of Classification Search
CPC ........... H04W 72/046; H04W 72/0413; H04W 72/085; H04W 28/04; H04W 36/0079;
(Continued)

(56) References Cited

U.S. PATENT DOCUMENTS 9,900,891 B1   2/2018  Islam et al.
10,567,064 B2  2/2020  Wang et al.
(Continued)

FOREIGN PATENT DOCUMENTS

CN      109076365 A    12/2018
WO   WO2018129300 A1    7/2018
(Continued)

OTHER PUBLICATIONS

3GPP TSG RAN WG1 Meeting# 90 (R1-1714337) (Year: 2017).*
(Continued)

*Primary Examiner* — Sam K Ahn
*Assistant Examiner* — Amneet Singh
(74) *Attorney, Agent, or Firm* — Holland & Hart LLP

(57) ABSTRACT

Methods, systems, and devices for wireless communications are described. A user equipment (UE) may determine a first transmission on a first set of beams is unsuccessful and determine a second transmission on a second set of beams is successful. The UE may identify a beam from the second set of beams based on the determination that the second transmission on the second set of beams is successful. The UE may transmit, to a base station, an indication of the identified beam from the second set of beams and communicate with the base station via the identified beam from the second set of beams.

27 Claims, 16 Drawing Sheets

(51) Int. Cl.
  *H04L 1/18* (2006.01)
  *H04W 28/04* (2009.01)
  *H04W 72/08* (2009.01)
  *H04W 72/044* (2023.01)
  *H04L 1/1607* (2023.01)
  *H04L 1/1867* (2023.01)

(52) U.S. Cl.
  CPC ....... *H04W 28/04* (2013.01); *H04W 72/0413* (2013.01); *H04W 72/085* (2013.01)

(58) Field of Classification Search
  CPC ........... H04W 36/0055; H04W 72/042; H04W 76/27; H04W 16/28; H04W 88/02; H04W 88/08; H04L 1/1896; H04L 1/1671; H04L 5/0023; H04L 5/0048; H04L 5/0055; H04B 7/088; H04B 7/04; H04B 7/0695
  See application file for complete search history.

(56) References Cited

U.S. PATENT DOCUMENTS

| | | | |
|---|---|---|---|
| 2013/0258885 A1* | 10/2013 | Yu | H04L 1/188 370/252 |
| 2016/0353510 A1* | 12/2016 | Zhang | H04L 43/16 |
| 2019/0013857 A1* | 1/2019 | Zhang | H04B 7/0617 |
| 2019/0052343 A1 | 2/2019 | Li et al. | |
| 2019/0069314 A1* | 2/2019 | Takeda | H04W 72/04 |
| 2019/0132858 A1* | 5/2019 | Petersson | H04W 72/06 |
| 2019/0254042 A1 | 8/2019 | Cirik et al. | |
| 2020/0374960 A1* | 11/2020 | Deenoo | H04W 72/14 |

FOREIGN PATENT DOCUMENTS

WO  WO 2019024110 A1 *  2/2019
WO  WO-2019032882 A1   2/2019

OTHER PUBLICATIONS

International Search Report and Written Opinion—PCT/US2020/034236—ISA/EPO—dated Jul. 23, 2020.
U.S. Appl. No. 62/865,139, filed Jun. 21, 2019, 97 Pages.

* cited by examiner

TECHNIQUES UPDATING BEAMS IN PERIODIC TRANSMISSIONS

CROSS REFERENCE

The present Application for Patent claims the benefit of U.S. Provisional Patent Application No. 62/865,139 by ZHOU et al., entitled "TECHNIQUES UPDATING BEAMS IN PERIODIC TRANSMISSIONS," filed Jun. 21, 2019, assigned to the assignee hereof, and expressly incorporated by reference herein.

FIELD OF DISCLOSURE

The following relates, for example, to wireless communications, and more specifically to techniques updating beams in periodic transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A wireless communications system may support a large number of UEs. In such applications, base stations or UEs may utilize beamforming to improve signal quality and reliability. In some case, a transmission between a base station and a UE may fail due to blocking or other causes.

SUMMARY

The described techniques relate to improved methods, systems, devices, and apparatuses that support techniques updating beams in periodic transmissions. A user equipment (UE) and a base station may communicate using periodic, beamformed transmissions. For example, the UE and the base station may be configured to communicate according to a semi-periodic scheduling (SPS) configuration, a configured grant (CG) configuration, or both. For SPS communications, the base station may be allocated periodic resources for downlink transmissions to one or more UEs. For CG communications, one or more UEs may each be allocated periodic resources for uplink transmissions to the base station. In some cases, a beam used for periodic communications may be updated. If, for example, a periodic transmission from the base station using a first beam is unsuccessful, the active beam for downlink periodic transmissions may be updated to another beam. For example, the strength of one or more beams may be measured, and the beam for downlink periodic transmissions may be updated to a different beam which provides a stronger signal strength at the UE.

Enhanced techniques for updating beams in periodic transmissions are described. For example, a UE may select the beam for the beam update. This may enable the UE to quickly switch to a more reliable or higher quality beam. The UE may explicitly or implicitly indicate the beam update. For example, the UE may transmit a bit field explicitly indicating the beam update. Additionally, or alternatively, the UE may transmit to the base station using an uplink resource which corresponds to the selected beam to implicitly indicate the beam update. Techniques for an SPS beam update and a CG beam update are described herein, though the following techniques may be applicable for other periodic communications schemes.

A method of wireless communications at a UE is described. The method may include determining a first transmission on a first set of beams is unsuccessful, determining a second transmission on a second set of beams is successful, identifying a beam from the second set of beams based on the determination that the second transmission on the second beam is successful, transmitting, to a base station, an indication of the identified beam from the second set of beams, and communicating with the base station via the identified beam from the second set of beams.

An apparatus for wireless communications at a UE is described. The apparatus may include a processor, memory coupled with the processor, and instructions stored in the memory. The instructions may be executable by the processor to cause the apparatus to determine a first transmission on a first set of beams is unsuccessful, determine a second transmission on a second set of beams is successful, identify a beam from the second set of beams based on the determination that the second transmission on the second beam is successful, transmit, to a base station, an indication of the identified beam from the second set of beams, and communicate with the base station via the identified beam from the second set of beams.

Another apparatus for wireless communications at a UE is described. The apparatus may include means for determining a first transmission on a first set of beams is unsuccessful, determining a second transmission on a second set of beams is successful, identifying a beam from the second set of beams based on the determination that the second transmission on the second beam is successful, transmitting, to a base station, an indication of the identified beam from the second set of beams, and communicating with the base station via the identified beam from the second set of beams.

A non-transitory computer-readable medium storing code for wireless communications at a UE is described. The code may include instructions executable by a processor to determine a first transmission on a first set of beams is unsuccessful, determine a second transmission on a second set of beams is successful, identify a beam from the second set of beams based on the determination that the second transmission on the second beam is successful, transmit, to a base station, an indication of the identified beam from the second set of beams, and communicate with the base station via the identified beam from the second set of beams.

In some examples of the method, apparatuses, and non-transitory computer-readable medium described herein, the first transmission and the second transmission may be communicated during a first data exchange cycle scheduled between the UE and the base station.

In some examples of the method, apparatuses, and non-transitory computer-readable medium described herein, the communicating further may include operations, features, means, or instructions for communicating with the base station via the identified beam during a second data exchange cycle scheduled between the UE and the base station, where the second data exchange cycle may be subsequent to the first data exchange cycle.

In some examples of the method, apparatuses, and non-transitory computer-readable medium described herein, the beam used for communications during the second data exchange cycle may be identified based on a latest transmitted indication of a set of indications transmitted during the first data exchange.

Some examples of the method, apparatuses, and non-transitory computer-readable medium described herein may further include operations, features, means, or instructions for measuring a demodulation reference signal (DMRS) in the second transmission for each beam from the second set of beams, where the beam may be identified based on the measuring.

In some examples of the method, apparatuses, and non-transitory computer-readable medium described herein, the indication includes a bit field indicating the identified beam from the second set of beams.

In some examples of the method, apparatuses, and non-transitory computer-readable medium described herein, the bit field indicates a transmission configuration indicator (TCI) state for each beam of the second set of beams.

In some examples of the method, apparatuses, and non-transitory computer-readable medium described herein, the bit field indicates a spatial relationship information identifier for each beam of the second set of beams.

In some examples of the method, apparatuses, and non-transitory computer-readable medium described herein, transmitting the indication may include operations, features, means, or instructions for transmitting the indication on an uplink resource corresponding to the identified beam.

In some examples of the method, apparatuses, and non-transitory computer-readable medium described herein, communicating with the base station via the identified beam may include operations, features, means, or instructions for receiving a physical downlink shared channel (PDSCH) transmission from the base station on the identified beam.

In some examples of the method, apparatuses, and non-transitory computer-readable medium described herein, the first transmission may be a downlink periodic transmission, and the second transmission may be a retransmission of the first transmission.

In some examples of the method, apparatuses, and non-transitory computer-readable medium described herein, the indication may be transmitted with an acknowledgment or negative acknowledgment for the second transmission.

In some examples of the method, apparatuses, and non-transitory computer-readable medium described herein, the first transmission and the communicating may be configured according to an SPS configuration.

In some examples of the method, apparatuses, and non-transitory computer-readable medium described herein, communicating with the base station via the identified beam may include operations, features, means, or instructions for transmitting a PUSCH transmission to the base station on the identified beam.

In some examples of the method, apparatuses, and non-transitory computer-readable medium described herein, the first transmission may be an uplink transmission, the second transmission may be a downlink transmission carrying a demodulation reference signal (DMRS), and the indication may be transmitted with a retransmission of the first transmission.

In some examples of the method, apparatuses, and non-transitory computer-readable medium described herein, the first transmission and the communicating may be configured according to a CG configuration.

In some examples of the method, apparatuses, and non-transitory computer-readable medium described herein, the indication indicates a beam sweep pattern.

In some examples of the method, apparatuses, and non-transitory computer-readable medium described herein, the beam sweep pattern includes at least the second set of beams, where the second transmission is communicated on each beam of the beam sweep pattern.

Some examples of the method, apparatuses, and non-transitory computer-readable medium described herein may further include operations, features, means, or instructions for communicating a third transmission on the identified beam, where the first transmission may be configured according to a first periodic communication configuration, and the third transmission may be configured according to a second periodic communication configuration.

Some examples of the method, apparatuses, and non-transitory computer-readable medium described herein may further include operations, features, means, or instructions for communicating a third transmission on the identified beam, where the third transmission may be in an opposite transmission direction from the first transmission.

Some examples of the method, apparatuses, and non-transitory computer-readable medium described herein may further include operations, features, means, or instructions for receiving an indication from the base station to use the identified beam for the third transmission.

A method of wireless communications at a base station is described. The method may include determining a first transmission on a first set of beams is unsuccessful, determining a second transmission on a second set of beams is successful, receiving, from a UE, an indication of a beam from the second set of beams, and communicating with the UE via the indicated beam.

An apparatus for wireless communications at a base station is described. The apparatus may include a processor, memory coupled with the processor, and instructions stored in the memory. The instructions may be executable by the processor to cause the apparatus to determine a first transmission on a first set of beams is unsuccessful, determine a second transmission on a second set of beams is successful, receive, from a UE, an indication of a beam from the second set of beams, and communicate with the UE via the indicated beam.

Another apparatus for wireless communications at a base station is described. The apparatus may include means for determining a first transmission on a first set of beams is unsuccessful, determining a second transmission on a second set of beams is successful, receiving, from a UE, an indication of a beam from the second set of beams, and communicating with the UE via the indicated beam.

A non-transitory computer-readable medium storing code for wireless communications at a base station is described. The code may include instructions executable by a processor to determine a first transmission on a first set of beams is unsuccessful, determine a second transmission on a second set of beams is successful, receive, from a UE, an indication of a beam from the second set of beams, and communicate with the UE via the indicated beam.

In some examples of the method, apparatuses, and non-transitory computer-readable medium described herein, the first transmission and the second transmission may be communicated during a data exchange cycle scheduled between the UE and the base station.

In some examples of the method, apparatuses, and non-transitory computer-readable medium described herein, the communicating further may include operations, features, means, or instructions for communicating with the UE via the indicated beam during a second data exchange cycle scheduled between the UE and the base station, where the second data exchange cycle may be subsequent to the first data exchange cycle.

In some examples of the method, apparatuses, and non-transitory computer-readable medium described herein, the beam used for communications during the second data exchange cycle may be identified based on a latest transmitted indication of a set of indications transmitted during the first data exchange.

In some examples of the method, apparatuses, and non-transitory computer-readable medium described herein, the indication includes a bit field indicating the indicated beam from the second set of beams.

In some examples of the method, apparatuses, and non-transitory computer-readable medium described herein, the bit field indicates a TCI state for each beam of the second set of beams.

In some examples of the method, apparatuses, and non-transitory computer-readable medium described herein, the bit field indicates a spatial relationship information identifier for each beam of the second set of beams.

In some examples of the method, apparatuses, and non-transitory computer-readable medium described herein, receiving the indication may include operations, features, means, or instructions for receiving the indication on an uplink resource corresponding to the indicated beam.

In some examples of the method, apparatuses, and non-transitory computer-readable medium described herein, communicating with the UE via the identified beam may include operations, features, means, or instructions for transmitting a PDSCH transmission to the UE on the indicated beam.

In some examples of the method, apparatuses, and non-transitory computer-readable medium described herein, the first transmission may be a downlink periodic transmission, and the second transmission may be a retransmission of the first transmission.

In some examples of the method, apparatuses, and non-transitory computer-readable medium described herein, the indication may be received with an acknowledgment or negative acknowledgment for the second transmission.

In some examples of the method, apparatuses, and non-transitory computer-readable medium described herein, the first transmission and the communicating may be configured according to an SPS configuration.

In some examples of the method, apparatuses, and non-transitory computer-readable medium described herein, communicating with the UE via the identified beam may include operations, features, means, or instructions for receiving a PUSCH transmission from the UE on the indicated beam.

In some examples of the method, apparatuses, and non-transitory computer-readable medium described herein, the first transmission may be an uplink transmission, the second transmission may be a downlink transmission carrying a demodulation reference signal (DMRS), and the indication may be received with a retransmission of the first transmission.

In some examples of the method, apparatuses, and non-transitory computer-readable medium described herein, the first transmission and the communicating may be configured according to a CG configuration.

In some examples of the method, apparatuses, and non-transitory computer-readable medium described herein, the indication indicates a beam sweep pattern.

In some examples of the method, apparatuses, and non-transitory computer-readable medium described herein, the beam sweep pattern includes at least the second set of beams, where the second transmission is communicated on each beam of the beam sweep pattern Some examples of the method, apparatuses, and non-transitory computer-readable medium described herein may further include operations, features, means, or instructions for communicating a third transmission on the indicated beam, where the first transmission may be configured according to a first periodic communication configuration, and the third transmission may be configured according to a second periodic communication configuration.

Some examples of the method, apparatuses, and non-transitory computer-readable medium described herein may further include operations, features, means, or instructions for communicating a third transmission on the indicated beam, where the third transmission may be in an opposite transmission direction from the first transmission.

Some examples of the method, apparatuses, and non-transitory computer-readable medium described herein may further include operations, features, means, or instructions for transmitting an indication to the UE to use the indicated beam for the third transmission.

DETAILED DESCRIPTION

Figure 1:
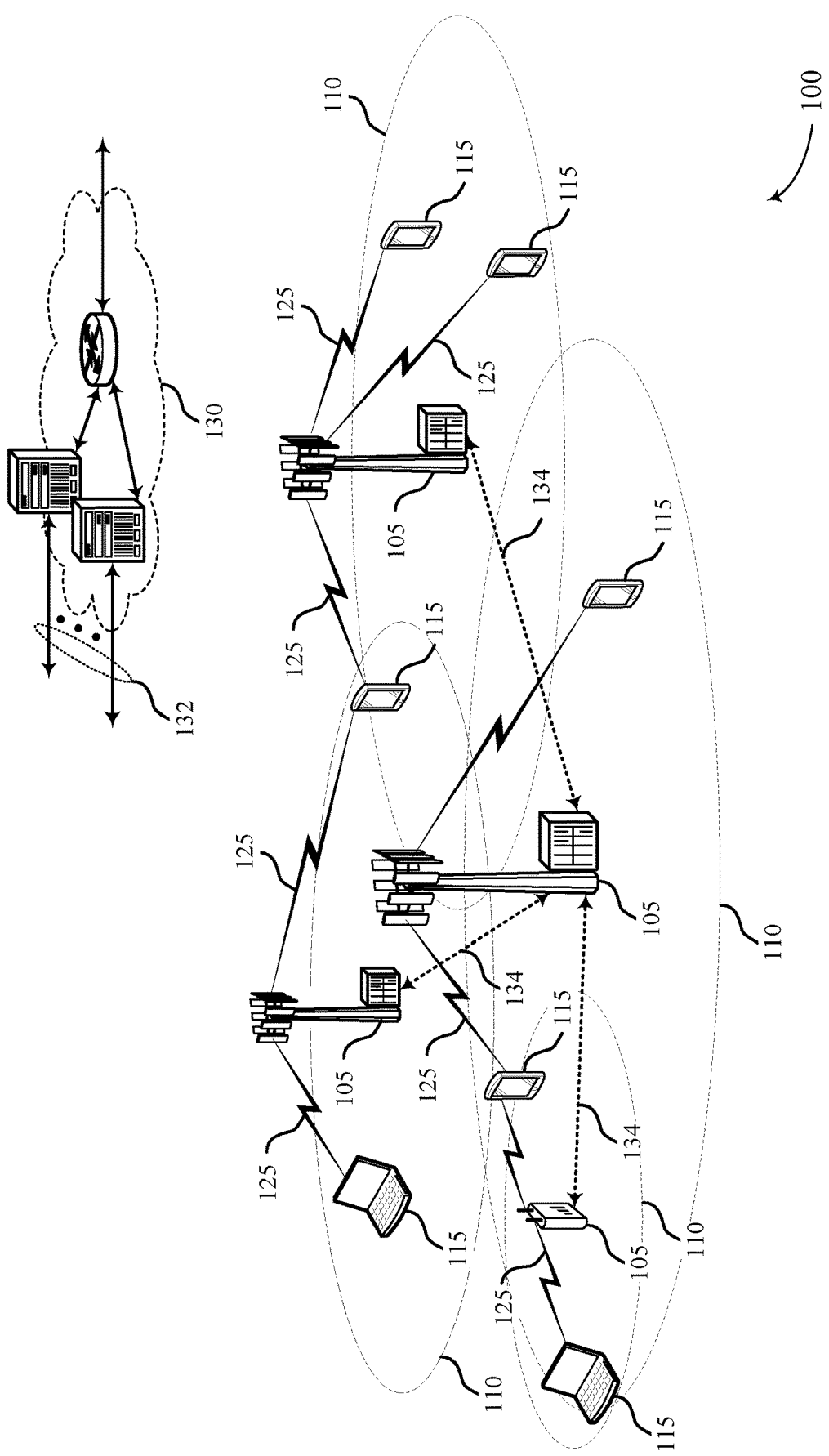
FIG. 1 illustrates an example of a system for wireless communications that supports techniques updating beams in periodic transmissions in accordance with aspects of the present disclosure.

A user equipment (UE) and a base station may communicate using periodic, beamformed transmissions. For example, the UE and the base station may be configured to communicate according to a semi-periodic scheduling (SPS) configuration, a configured grant (CG) configuration, or both. For SPS communications, the base station may be allocated periodic resources for downlink transmissions to one or more UEs. For CG communications, one or more UEs may each be allocated periodic resources for uplink transmissions to the base station. A wireless device may be allocated the periodic resources based on a cycle. For example, resources for the base station to transmit an SPS message may be configured once per cycle, where the cycle's duration may correspond to the periodicity of the SPS configuration. If a periodic transmission fails or is unsuccessful, there may be a period for retransmission attempts before the next cycle begins.

In some cases, a beam used for periodic communications may be updated. If, for example, a periodic transmission from the base station using a first beam is unsuccessful, the active beam for downlink periodic transmissions may be updated to another beam. Although the transmission from the base station using the first beam is unsuccessful, the first beam may still be used for communications (e.g., the beam may not have failed). The strength of one or more beams may be measured, and the beam for downlink periodic transmissions may be updated to a different beam which provides a stronger signal strength at the UE.

In some wireless communications systems, a base station may select the beam updates. For example, if a retransmission is successful with a new beam, the base station may indicate the selected beam to the UE. The base station may update the beam for the next cycle by transmitting a reactivation downlink control information (DCI) to the UE. The UE may decode the reactivation DCI, identify the beam indicated by the reactivation DCI, and use the indicated beam for periodic transmissions in the next cycle. However, decoding the reactivation DCI in these systems may cause latency for the beam update. For example, it may take the UE a couple of slots to decode. This may lead to increased latency or reduced signal quality in communications, as the UE may continue to use the previous, weaker beam until the new beam is identified.

Enhanced techniques for updating beams in periodic transmissions are described. For example, a UE may select the updated beam instead of waiting for a base station to transmit a reactivation DCI. This may enable the UE to switch to a more reliable or relatively higher quality beam sooner than other techniques. The UE may explicitly or implicitly indicate the beam update. For example, the UE may transmit a bit field explicitly indicating the beam update. Additionally, or alternatively, the UE may transmit to the base station using an uplink resource which corresponds to the selected beam to implicitly indicate the beam update. Techniques for an SPS beam update and a CG beam update are described herein, though the following techniques may be applicable for other periodic communications schemes.

Aspects of the disclosure are initially described in the context of a wireless communications system. Aspects of the disclosure are further illustrated by and described with reference to apparatus diagrams, system diagrams, and flowcharts that relate to techniques updating beams in periodic transmissions.

FIG. 1 illustrates an example of a wireless communications system 100 that supports techniques updating beams in periodic transmissions in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, such as in the range of 300 megahertz (MHz) to 300 gigahertz (GHz). For example, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), unlicensed radio frequency spectrum band radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at one or more orientations with respect to an antenna array experience constructive interference while others experience destructive interference. The adjustment of signals communicated via the antenna elements may include a transmitting device or a receiving device applying an amplitude and phase offsets to signals carried via each of the antenna elements associated with the device. The adjustments associated with each of the antenna elements may be defined by a beamforming weight set associated with an orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a carrier bandwidth, or may be configurable to support communications over one of a set of carrier bandwidths. In some examples, the wireless communications system 100 may include base stations 105 or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 and a base station 105 may communicate using periodic, beamformed transmissions. For example, the UE 115 and the base station 105 may be configured to communicate according to an SPS configuration, a CG configuration, or both. For SPS communications, the base station 105 may be allocated periodic resources for downlink transmissions to one or more UEs 115. For CG communications, one or more UEs 115 may each be allocated periodic resources for uplink transmissions to the base station 105. In some cases, a beam used for periodic communications may be updated. If, for example, a periodic transmission from the base station 105 using a first beam is unsuccessful, the active beam for downlink periodic transmissions may be updated to another beam. In some cases, although the first beam is unsuccessful, the beam may be used for other communications (e.g., the beam may not have failed). The strength of one or more beams may be measured, and the beam for downlink periodic transmissions may be updated to a different beam which provides a stronger signal strength at the UE.

Enhanced techniques for updating beams in periodic transmissions are described. For example, a UE 115 may select the beam for the beam update. This may enable the UE 115 to quickly switch to a more reliable or relatively higher quality beam. The UE 115 may explicitly or implicitly indicate the beam update. For example, the UE 115 may transmit a bit field explicitly indicating the beam update. Additionally, or alternatively, the UE 115 may transmit to the base station 105 using an uplink resource which corresponds to the selected beam to implicitly indicate the beam update. Techniques for an SPS beam update and a CG beam update are described herein, though the following techniques may be applicable for other periodic communications schemes.

Figure 2:
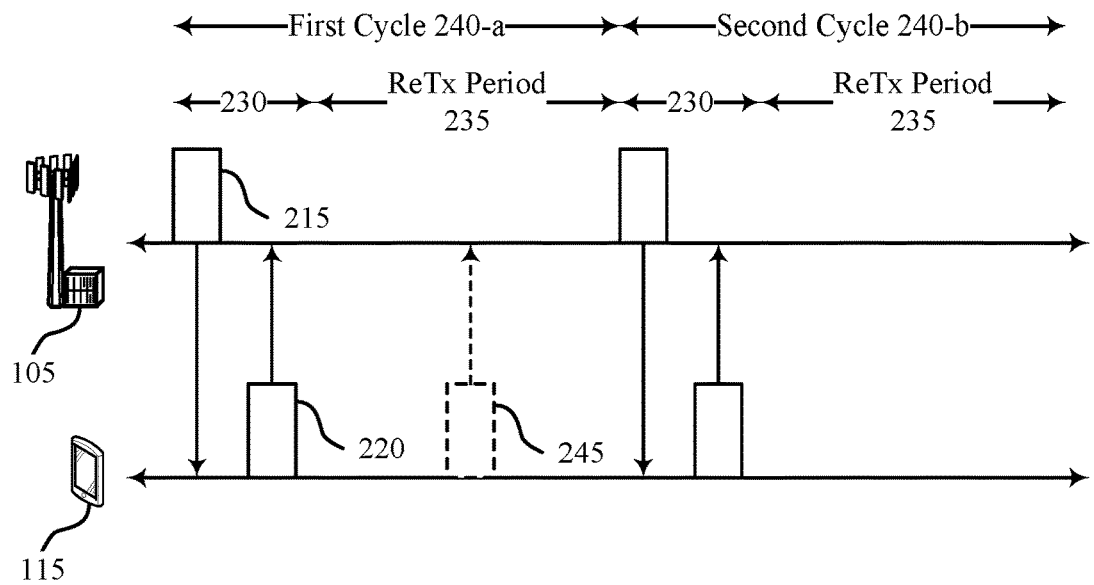
FIG. 2 illustrates an example of a wireless communications system that supports techniques updating beams in periodic transmissions in accordance with aspects of the present disclosure.
Figure 2:
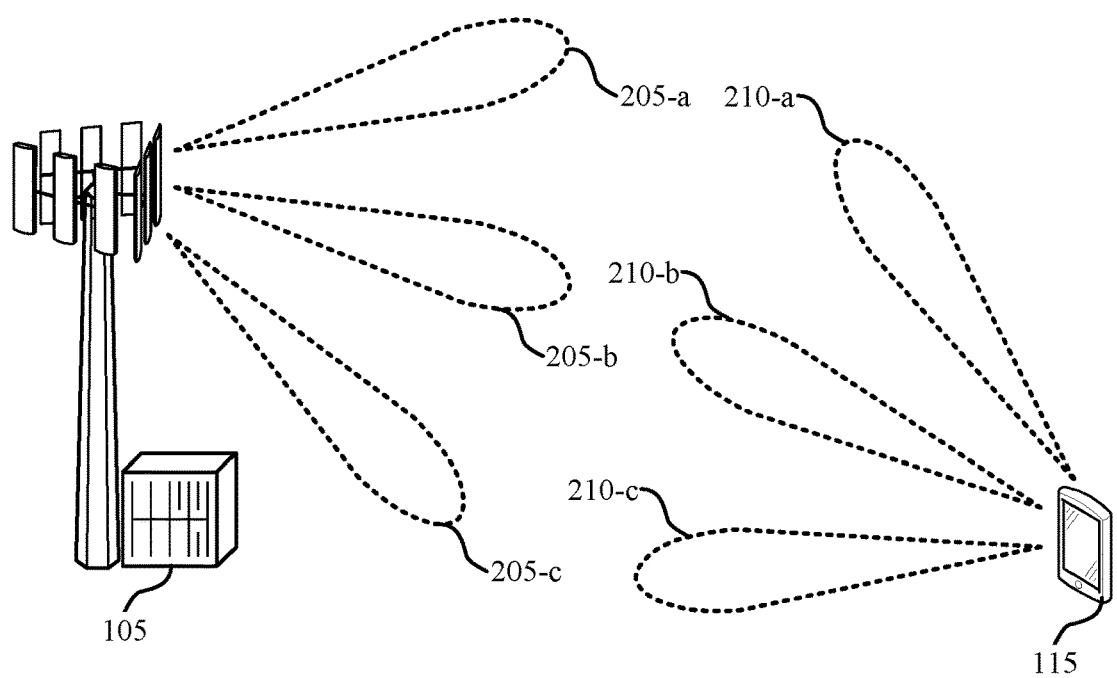

FIG. 2 illustrates an example of a wireless communications system 200 that supports techniques updating beams in periodic transmissions in accordance with aspects of the present disclosure. In some examples, the wireless communications system 200 may implement aspects of wireless communications system 100. The wireless communications system 200 may include a UE 115 and a base station 105, which may be examples of a UE 115 and a base station 105 as described with reference to FIG. 1.

The UE 115 and the base station 105 may communicate using beamformed transmissions. For example, the base station 105 may directionally transmit or monitor using one or more beams 205, and the UE 115 may directionally transmit or monitor using a beam 210. In some cases, beams, such as the beams 205 and the beams 210, may include aspects of a transmit beam, a receive beam, or both.

The wireless communications system 200 may support configurations for periodic or semi-periodic communications. For example, the UE 115 and the base station 105 may be configured to communicate according to an SPS configuration, a CG configuration, or both. For SPS communications, the base station 105 may be allocated periodic resources for downlink transmissions to one or more UEs 115. For CG communications, one or more UEs 115 may each be allocated periodic resources for uplink transmissions to the base station 105. A wireless device may be allocated the periodic resources based on a cycle 240. In some cases, periodic resources for the base station 105 to transmit an SPS message may be configured once per cycle 240. For example, the cycle duration may correspond to the periodicity of the SPS configuration.

For example, the base station 105 may transmit a downlink shared channel message (e.g., a physical downlink shared channel (PDSCH) message 215) to the UE 115 within an initial transmit period 230 of a cycle 240 (e.g., first cycle 240-a). Additionally, or alternatively, the UE 115 may transmit an uplink shared channel message (e.g., a physical uplink shared channel (PUSCH) message 220) to the base station 105 within the initial transmit period 230 of first cycle 240-a. the UE 115 and the base station 105 may each be allocated resources again for a PDSCH message 215 or a PUSCH message 220 during the initial transmit period 230 of the next cycle 240 (e.g., second cycle 240-b).

If a periodic transmission is unsuccessfully received, there may be a period for retransmission attempts (e.g., a retransmission period 235) before the next cycle 240 for the next periodic transmission. In some cases, a cycle 240 of the periodic communications configuration (e.g., one period) may include a period for an initial transmission (e.g., the initial transmit period 230) and the retransmission period 235. For example, if PUSCH message 220 is unsuccessfully received at the base station 105, then the base station 105 may report a negative acknowledgement message (NACK) for the unsuccessfully received PUSCH message 220. The UE 115 may then have an opportunity to transmit a retransmission 245 of the PUSCH message 220 within the same cycle 240.

Periodic communications, such as SPS communications and CG communications, may apply beamforming techniques. In some examples, the base station 105 may transmit a PDSCH message toward the UE 115 using beam 205-b according to an SPS periodicity, and the UE 115 may monitor for the transmission using beam 210-b according to the SPS periodicity.

In some cases, a beam used for periodic communications may be updated. If, for example, a periodic transmission from the base station 105 using a first beam 205 is unsuccessful, the active beam for downlink periodic transmissions may be updated to another beam. For example, the beam for downlink periodic transmissions may be updated to a second beam which provides a stronger signal strength at the UE 115.

In some wireless communications systems, a base station 105 may select the beam updates for periodic communications with a UE 115. For example, if a retransmission is successful with a new beam, the base station 105 may update the beam for the next cycle by transmitting a reactivation DCI to the UE 115. The reactivation DCI may indicate the selected beam to the UE 115. The UE 115 may then decode the reactivation DCI, identify the beam indicated by the reactivation DCI, and use the indicated beam for periodic transmissions in the next cycle 240. However, decoding the reactivation DCI in these systems may cause latency for the beam update. For example, it may take the UE 115 two or more slots to decode the reactivation DCI. The delay introduced by the UE 115 decoding the reactivation DCI may lead to increased latency or reduced signal quality in communications, as the UE 115 may continue to use the previous beam until the new beam is identified.

The wireless communications system 200 may support enhanced techniques for updating beams in periodic transmissions. For example, the UE 115 may select the updated beam instead of waiting for the base station 105 to transmit a reactivation DCI. This may enable the UE 115 to switch to a more reliable or higher quality beam sooner than other techniques. The UE 115 may explicitly or implicitly indicate the beam update. For example, the UE 115 may, in some cases, transmit a bitfield explicitly indicating the beam update. Additionally, or alternatively, the UE 115 may transmit to the base station 105 using an uplink channel corresponding to the updated beam to implicitly indicate the beam update. For example, the UE 115 may transmit an uplink message to the base station 105 using the updated beam.

In some cases, an initial SPS transmission in a cycle 240 may fail. The UE 115 may indicate the failure, and the base station 105 may retransmit the SPS transmission. The base station 105 may retransmit the SPS transmission using a set of beams, and the UE 115 may perform beam measurements on each beam of the set of beams. In some cases, the base station 105 may be able to re-use the initial beam for a retransmission, as the transmission failure may not correspond to a beam failure. However, to improve a likelihood of successful transmissions in later SPS occasions, the base station 105 may retransmit the SPS transmission using the set of beams.

The retransmission may be successful, and the UE 115 may transmit an acknowledgement message (ACK) in response to the retransmission. The UE 115 may transmit an indication of the highest quality beam with the ACK. Then, for the next cycle 240, the base station 105 may transmit another SPS transmission using the indicated beam. An example of an SPS beam update is described in more detail with reference to FIG. 3.

In another example, an initial CG transmission in a cycle 240 may fail. The base station 105 may indicate the failure and transmit a control channel message to schedule the CG retransmission. The base station 105 may transmit the control channel message using a set of beams and the UE 115 may perform beam measurements on each beam of the set of beams. The UE 115 may identify the highest quality beam and retransmit the CG transmission using identified beam. The retransmission may be successful, and the UE 115 may send a CG transmission during the next cycle using the identified beam. An example of a CG beam update is described in more detail with reference to FIG. 4.

In some cases, instead of indicating a single beam, the UE 115 may indicate beam sweep pattern for SPS transmissions, CG transmissions, or both, in the next cycle 240. In some cases, the UE 115 or the base station 105 may be configured for multiple SPS or CG configurations. In some cases, a beam update made based on one SPS or CG configuration may also be applied to other SPS or CG configurations. Or, in some examples, the beam update may be applied for the associated SPS or CG configuration. In some cases, the base station 105 may indicate whether a beam update made for one SPS or CG configuration can be applied to other SPS or CG configurations (e.g., via DCI, a MAC-control element (CE), or an RRC message).

In some cases, the beam sweep pattern may correspond to multiple beam pair links communicated in a TDM based, FDM based, or spatial division multiplexing (SDM) based scheme, or any combination thereof. In some examples, the TDM based beam sweep pattern may configure the downlink data transmission, the uplink control transmission for the downlink data transmission, or the uplink data transmission via different beam pair links at different time allocations. In some cases, the different time allocations correspond to different slots or different mini-slots. In some examples, the FDM based beam sweep pattern configures the downlink data transmission, the uplink control transmission for the downlink data transmission, or the uplink data transmission via different beam pair links at different frequency allocations. In some cases, the SDM based beam sweep pattern configures the downlink data transmission, the uplink control transmission for the downlink data transmission, or the uplink data transmission via different beam pair links simultaneously at overlapped allocations in time and frequency. In some cases, each of the multiple beam pair links may be indicated by a transmission configuration indicator (TCI) state or codepoint. In some cases, each of the multiple beam pair links may be indicated by a spatial relation indication.

The UE 115 may indicate a beam sweep pattern which may be used for uplink or downlink. The one or more beams indicated in the pattern may be time division multiplexed, frequency division multiplexed, or spatially division multiplexed. In some cases, a new beam indicated for CG may also be used for SPS, and vice versa. For example, the UE 115 may be configured for both CG communications and SPS communications, and the UE 115 may perform a beam update for the CG communications as described herein. In the next cycle, the UE 115 may use the updated beam for CG communications. In some cases, the UE 115 may use the updated beam to select a new beam for SPS communications. This may be supported based on the UE 115 having beam correspondence. For example, the updated beam for CG communications may correspond to another beam, in some cases the same beam, which the UE 115 may use for the SPS communications. In some cases, the base station 105 may indicate whether reusing beams for different periodic communications configurations is supported or enabled, such as via DCI, a MAC CE, or an RRC message.

If multiple new beam indications are received in a current cycle 240, the last indication received within a threshold of the end of the current cycle 240 may be used for the next cycle. For example, if a beam update indication is received within three slots from the end of the first cycle, that beam update may not be used. However, the beam update indication received closest to, but before, that threshold may be applied for the next cycle.

Figure 3:
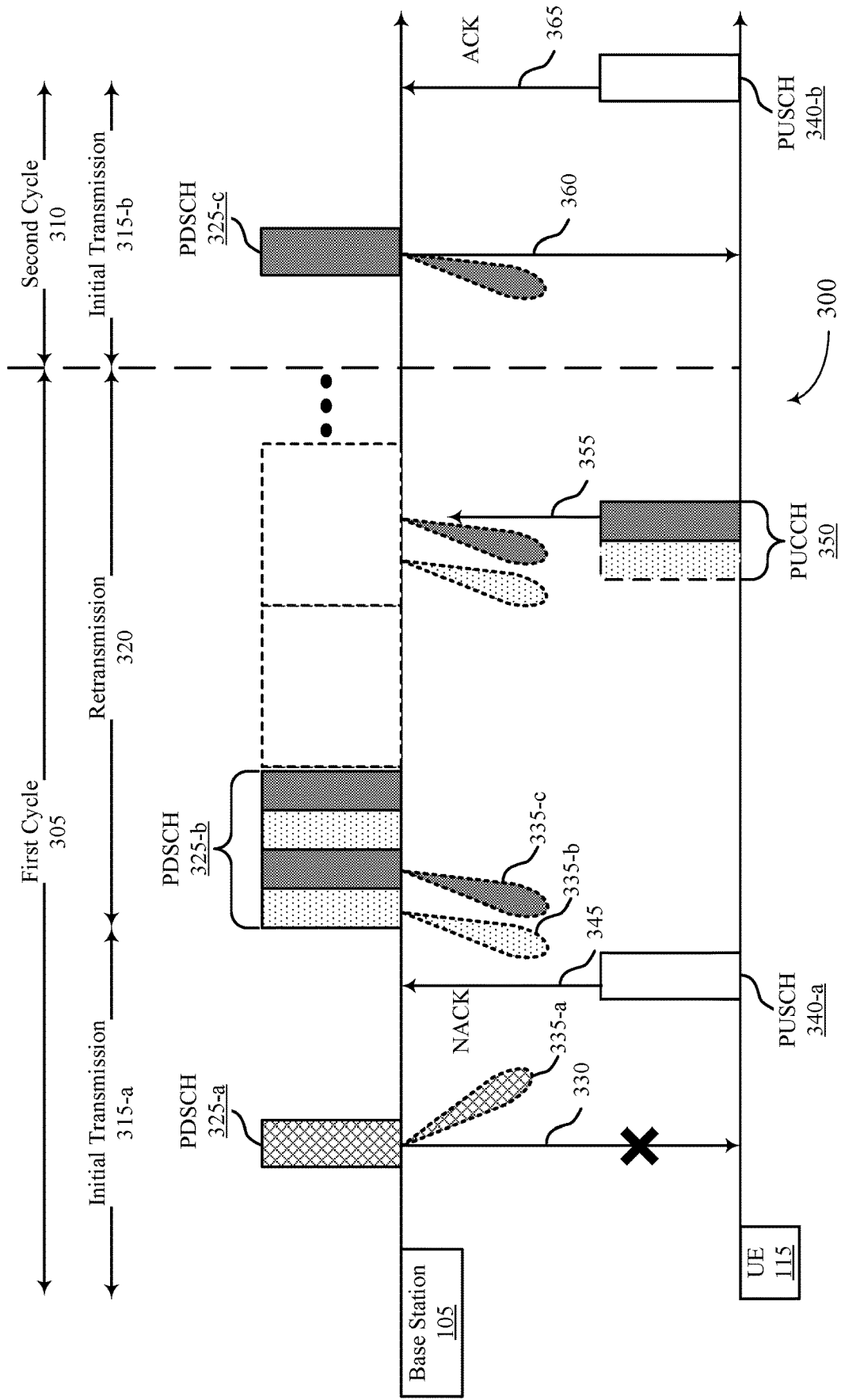
FIG. 3 illustrates an example of a semi-persistent scheduling (SPS) beam update that supports techniques updating beams in periodic transmissions in accordance with aspects of the present disclosure.

FIG. 3 illustrates an example of an SPS beam update 300 that supports techniques updating beams in periodic transmissions in accordance with aspects of the present disclosure. In some examples, the SPS beam update 300 may implement aspects of wireless communications system 100 and wireless communications system 200.

The SPS beam update 300 includes a first cycle 305 and a second cycle 310, which may be examples of SPS cycle as described with reference to FIG. 2. Each cycle may include an initial transmission period 315 and a retransmission period 320. For example, the first cycle 305 may include initial transmission period 315-a and the retransmission period 320. The second cycle 310 may include initial transmission period 315-b and a retransmission period (not shown).

A base station 105 may be allocated periodic resources to transmit a PDSCH message 325 to one or more UEs 115 during the initial transmission period 315 of each cycle. For example, at 330, the base station 105 may transmit a PDSCH message 325-a to a UE 115 using beam 335-a. The transmission at 330 on beam 335-a may fail or may be unsuccessful, which may trigger the SPS beam update process. The UE 115 may also be configured with periodic resources, such as resources for CG transmissions. At 345, the UE 115 may transmit PUSCH message 340-a carrying a NACK for PDSCH message 325-a. In some cases, the UE 115 may transmit a physical uplink control channel (PUCCH) message carrying NACK feedback for an unsuccessfully received PDSCH message 325.

During the retransmission period 320, the base station 105 may retransmit the PDSCH message 325 for the UE 115 using a set of beams 335 or beams of a beam sweep. The set of beams 335 may include one or more beams. For example, the base station 105 may retransmit the PDSCH message 325 (e.g., as PDSCH messages 325-b) using a set of beams 335, including at least beam 335-b and beam 335-c. The UE 115 may monitor for the retransmissions and perform beam measurements on the set of beams (e.g., including beam 335-b and beam 335-c). The UE 115 may then identify a beam of the set of beams 335, such as the highest quality beam. At 355, the UE 115 may transmit a PUCCH message 350 carrying ACK feedback to indicate that the SPS retransmission was received successfully.

In some cases, the UE 115 may explicitly or directly indicate the new beam index in the PUCCH message 350 to update the SPS beam for the second cycle 310. The new beam index may indicate a TCI state (e.g., using a bitfield) corresponding to the best beam measured before transmitting the PUCCH message 350 in the first cycle 305. For example, the UE 115 may indicate a TCI state for the highest quality beam among beam 335-a, beam 335-b, beam 335-c, and any other beam 335 measured during the first cycle 305 prior to transmitting the PUCCH message 350 at 355. The new beam may be based on measurements of a DMRS of PDSCH messages with different beams in the initial SPS transmission and any retransmissions. The UE 115 may transmit the new beam index indication in the PUCCH message 350. In some cases, the UE 115 may transmit the PUCCH message 350 using a beam corresponding to each beam of the beam sweep used to transmit PDSCH messages 325-b.

In some cases, the UE 115 may implicitly indicate the new beam to update the SPS beam for the second cycle 310. For example, each PDSCH transmitted on a beam of the beam sweep (e.g., transmitting the PDSCH message 325-b as a retransmission) may have a corresponding PUCCH with the same used beam. For an implicit indication, the UE 115 may select a beam and transmit the ACK on the PUCCH resource corresponding to the selected beam. For example, the UE 115 may transmit the ACK on PUCCH resources corresponding to the selected beam and may not transmit the ACK on other PUCCH resources. The base station 105 may receive the ACK, identify the selected beam, and use that beam for SPS transmissions in the second cycle 310.

In some cases, such as illustrated in FIG. 3, the UE 115 may determine that the beam 335-c is the strongest beam of the measured beams. The UE 115 may transmit a PUCCH message 350 carrying ACK feedback for the PDSCH message 325-b on PUCCH resources corresponding to beam 335-c. The base station 105 may receive the PUCCH message 350 on the PUCCH resource corresponding to beam 335-c, identify beam 335-c as the selected beam, and use beam 335-c for the SPS transmissions during the second cycle 310. For example, at 360, the base station 105 may transmit PDSCH message 325-c to the UE 115 using beam 335-c. At 365, the UE 115 may transmit PUSCH message 340-b carrying ACK feedback for PDSCH message 325-c.

Figure 4:
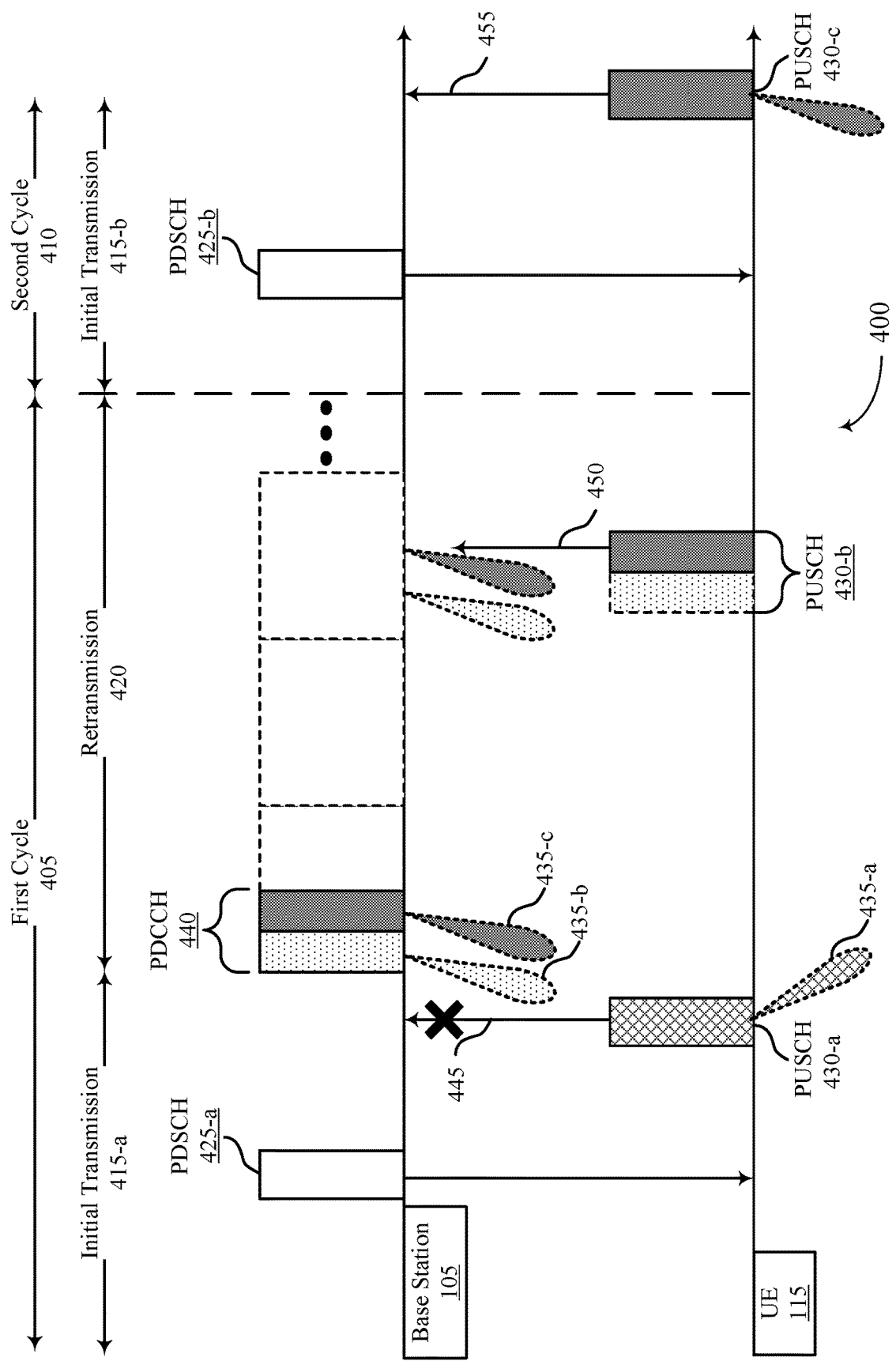
FIG. 4 illustrates an example of a configured grant (CG) beam update that supports techniques updating beams in periodic transmissions in accordance with aspects of the present disclosure.

FIG. 4 illustrates an example of a CG beam update 400 that supports techniques updating beams in periodic transmissions in accordance with aspects of the present disclosure. In some examples, the CG beam update 400 may implement aspects of wireless communications system 100 and wireless communications system 200.

The CG beam update 400 includes a first cycle 405 and a second cycle 410, which may be examples of SPS cycles as described with reference to FIG. 2. Each cycle may include an initial transmission period 415 and a retransmission period 420. For example, the first cycle 405 may include initial transmission period 415-a and the retransmission period 420. The second cycle 410 may include initial transmission period 415-b and a retransmission period (not shown).

A UE 115 may be periodically allocated resources to transmit a PUSCH message 430 to a base station 105 during the initial transmission period 415 of each cycle. The base station 105 may be allocated resources to receive PUSCH messages 430 from one or more UEs 115. The base station 105 may also be configured with periodic resources, such as resources for SPS transmissions. For example, the base station 105 may be allocated periodic resources in the initial transmission periods 415 to transmit PDSCH message 425-a and PDSCH message 425-b to a UE 115.

At 445, a UE 115 may transmit PUSCH message 430-a on beam 435-a. However, the transmission of PUSCH message 430-a may be unsuccessful. During the retransmission period 420, the base station 105 may transmit a physical downlink control channel (PDCCH) message carrying NACK feedback on a set of beams. For example, the base station 105 may transmit PDCCH messages 440 using a set of beams identified by a beam sweep. The beam sweep may identify, for example, at least beam 435-b and beam 435-c. In other examples, the beam sweep may include a different number of beams (e.g., one or more beams). The UE 115 may measure DMRS for each beam used to transmit the PDCCH messages 440. For example, the UE 115 may measure the DMRS of PDCCHs with different beams which were used to schedule the CG retransmission. The UE 115 may then identify a best, or a highest quality, beam of the set of beams used to transmit the PDCCH messages 440.

At 450, the UE 115 may transmit a retransmission of the PUSCH message 430 which was unsuccessfully transmitted at 445. The PUSCH message 430-b retransmission may indicate the selected beam for the CG beam update. In some cases, the UE 115 may explicitly indicate the new beam index in the retransmission (e.g., PUSCH message 430-b). The new beam index may be indicated as a TCI state identifier corresponding to the best, or a strongest, beam measured in the first cycle 405 before transmitting the PUSCH message 430-b at 450.

In some cases, the UE 115 may implicitly indicate the new beam to update the CG beam for the second cycle 410. For example, each beam swept PDCCH message scheduling the CG retransmission may have one corresponding PUSCH resource. For an implicit indication, the UE 115 may select a beam and transmit the retransmission on the PUSCH resource corresponding to the selected beam. For example, the UE 115 may transmit the CG retransmission on PUSCH resources corresponding to the selected beam and may not transmit the PUSCH retransmission on other PUSCH resources. The base station 105 may receive the PUSCH retransmission, identify the selected beam based on the PUSCH resource, and use the selected beam to monitor for CG transmissions in the second cycle 410.

In some examples, as shown, the UE 115 may determine the beam 435-c is the strongest beam of the measured beams. The UE 115 may transmit the PUSCH retransmission on PUSCH resources corresponding to beam 435-c. The base station 105 may receive the PUSCH retransmission on the PUSCH resource corresponding to beam 435-c, identify beam 435-c as the selected beam, and use beam 435-c for the SPS transmissions during the second cycle 410. For example, at 455, the UE 115 may transmit PUSCH message 430-c to the base station 105 using beam 435-c.

Figure 5:
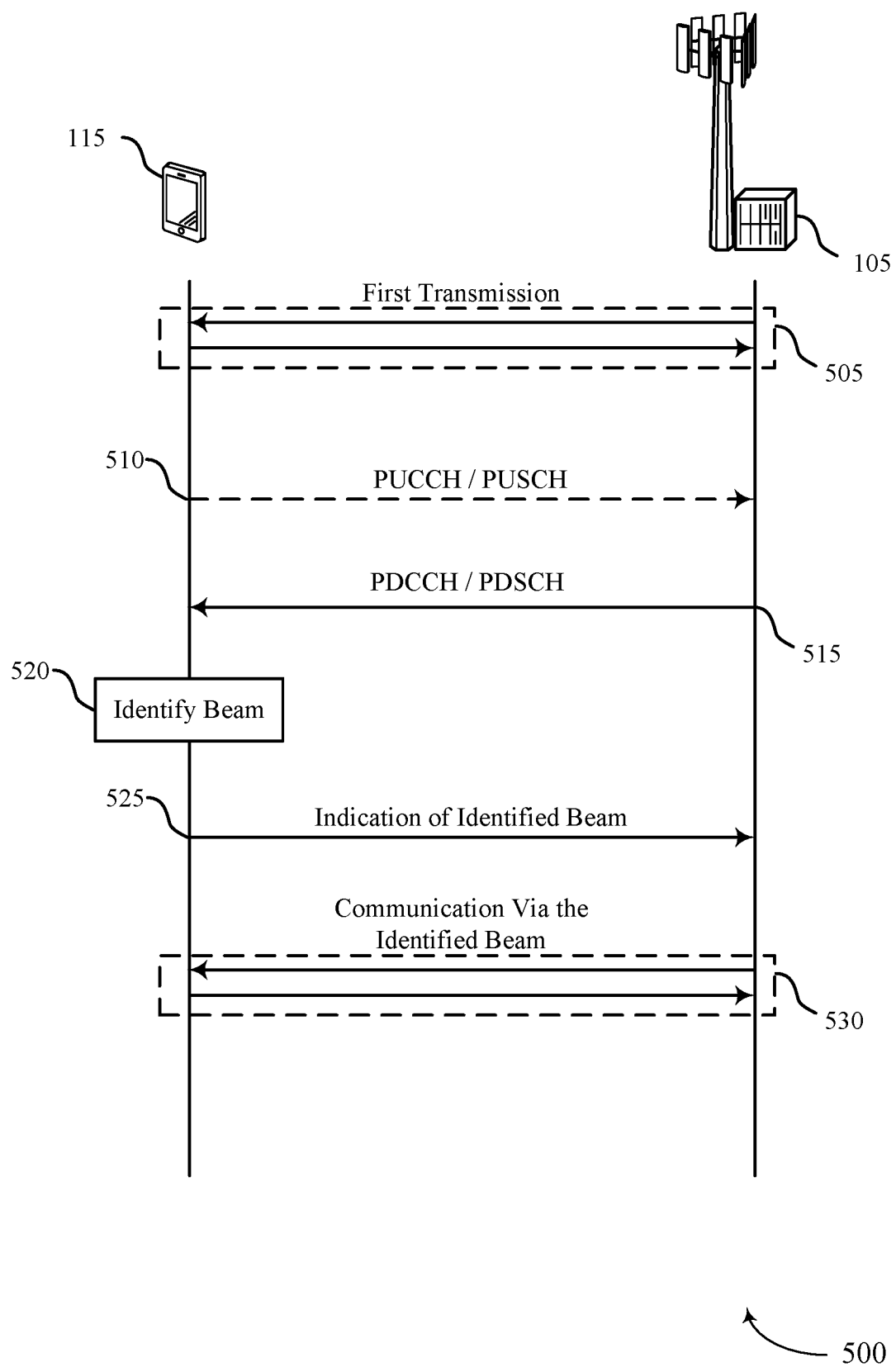
FIG. 5 illustrates an example of a process flow that supports techniques updating beams in periodic transmissions in accordance with aspects of the present disclosure.

FIG. 5 illustrates an example of a process flow 500 that supports techniques updating beams in periodic transmissions in accordance with aspects of the present disclosure. In some examples, process flow 500 may implement aspects of wireless communications system 100. Process flow 500 includes a UE 115 and a base station 105.

At 505, the UE 115 may transmit a first transmission to the base station 105, or the base station 105 may transmit a first transmission to the UE 115. In some examples, the UE 115 may be configured with CG resources to periodically transmit PUSCH messages to the base station 105. Additionally, or alternatively, the base station 105 may be configured with SPS resources to periodically transmit PDSCH messages to the UE 115. For CG communications, the UE 115 may transmit a PUSCH message to the base station 105 on periodic resources allocated to the UE 115 in a first data exchange cycle scheduled between the UE 115 and the base station 105. For SPS communications, the base station 105 may transmit a PDSCH message to the UE 115 on periodic resources allocated to the base station 105 in a first data exchange cycle scheduled between the UE 115 and the base station 105.

In some cases, such as if the first transmission is an SPS transmission, the UE 115 may determine the first transmission on a first set of beams is unsuccessful. The UE 115 may then transmit an uplink message carrying NACK feedback to the base station 105 at 510 to indicate that the first transmission failed. In some cases, the uplink message may be a PUCCH message, or the uplink message may be a PUSCH messaged scheduled for CG communications.

The base station 105 may determine that the first transmission on the first set of beams is unsuccessful based on receiving the NACK feedback. The base station 105 may retransmit the SPS transmission as a second transmission on a set of beams at 515. In some cases, the UE 115 may determine that the second transmission on a second set of beams is successful. At 520, the UE 115 may identify a beam from the second set of beams based on the determination that the second transmission on the second set of beams is successful. In some cases, the UE 115 may measure a DMRS in the second transmission for each beam from the second set of beams. The UE 115 may measure a DMRS for each transmission on each beam of the second set to identify a beam from the second set of beams.

At 525, the UE 115 may transmit, to the base station 105, an indication of the identified beam from the second set of beams. In some cases, the UE 115 may transmit an explicit indication of the identified beam. For example, the UE 115 may transmit a bit field indicating the identified beam from the second set of beams. Or, in some cases, the UE 115 may implicitly indicate the identified beam. For example, the UE 115 may transmit ACK/NACK feedback for the SPS retransmission on a PUCCH resource associated with the identified beam. At 530, the UE 115 and the base station 105 may communicate via the identified beam from the second set of beams. For example, the base station 105 may use the identified beam for another SPS transmission in a second cycle subsequent to the first cycle.

If the first transmission is a CG transmission, the base station 105 may transmit PDCCH at 515 to schedule a retransmission of the CG transmission. At 515, the base station 105 may transmit a PDCCH message carrying DCI on a second set of beams to schedule the CG retransmission. At 520, the UE 115 may identify a beam from the second set of beams. In some cases, the UE 115 may measure a DMRS for each PDCCH transmission on each beam of the second set of beams to identify the strongest beam.

At 525, the UE 115 may transmit, to the base station 105, an indication of the identified beam from the second set of beams. In some cases, the indication may be transmitted with the CG retransmission. In some cases, the UE 115 may transmit an explicit indication of the identified beam. For example, the UE 115 may transmit a bit field indicating the identified beam from the second set of beams. Or, in some cases, the UE 115 may implicitly indicate the identified beam. For example, the UE 115 may transmit the CG retransmission on a PUSCH resource associated with the identified beam. At 530, the UE 115 and the base station 105 may communicate via the identified beam from the second set of beams. For example, the UE 115 may use the identified beam for another CG transmission in a second cycle subsequent to the first cycle.

Figure 6:
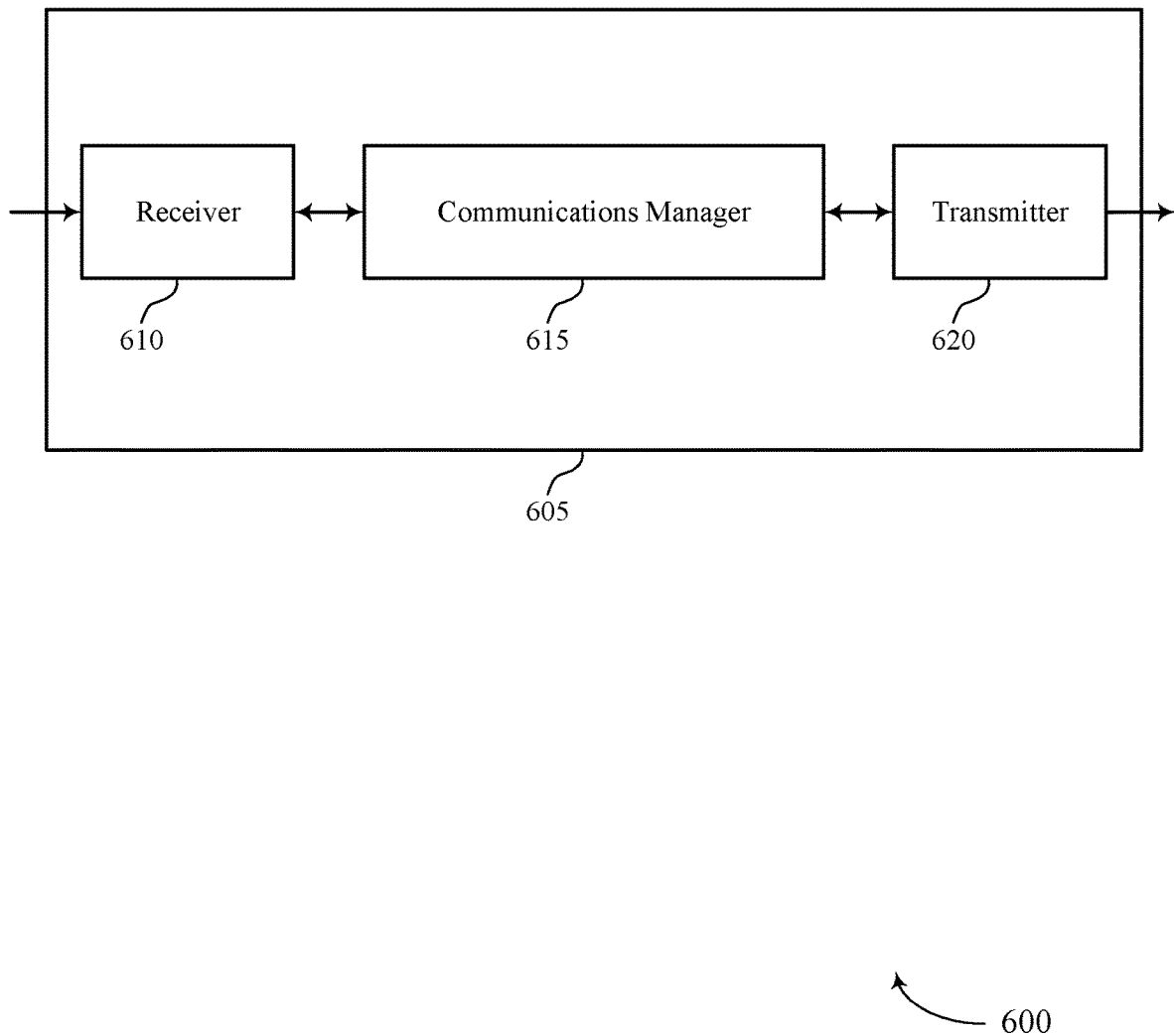
FIGS. 6 and 7 show block diagrams of devices that support techniques updating beams in periodic transmissions in accordance with aspects of the present disclosure.

FIG. 6 shows a block diagram 600 of a device 605 that supports techniques updating beams in periodic transmissions in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to techniques updating beams in periodic transmissions, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may determine a first transmission on a first set of beams is unsuccessful, determine a second transmission on a second set of beams is successful, identify a beam from the second set of beams based on the determination that the second transmission on the second set of beams is successful, transmit, to a base station, an indication of the identified beam from the second set of beams, and communicate with the base station via the identified beam from the second set of beams. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the UE communications manager 615 as described herein may be implemented to realize one or more potential advantages. One implementation may allow a UE 115 to reduce latency by switching to an improved beam faster than waiting for a reactivation DCI transmission from a base station 105 and decoding the reactivation DCI. The techniques described herein, such as supporting the UE 115 to identify the new beam, may enable the UE 115 to quickly switch to a higher quality beam. This may also improve communications quality, as the UE 115 may be using a higher quality beam sooner, leading to successful transmissions, where a UE may still be waiting to switch beams and experiencing communication failures.

In some cases, the actions performed by the UE communications manager 615 may enable a UE 115 to select an updated beam after an unsuccessful transmission and indicate the beam update to a base station. Such indications may enable techniques for efficiently switching beams at the UE 115, which may result in improved signal quality and more efficient communications (e.g., decreased latency in the system), among other advantages.

Based on implementing the indications as described herein, a processor of a UE 115 or base station 105 (e.g., a processor controlling the receiver 610, the communications manager 615, the transmitter 620, or a combination thereof) may update a beam in a periodic transmission while ensuring relatively efficient communications. For example, the indication of the beam update described herein may leverage a measurement of the strength of one or more beams used for periodic communications to determine an updated beam, which may realize reduced signaling overhead and power savings, among other benefits.

The transmitter 620 may transmit signals generated by other components of the device 605. In some examples, the transmitter 620 may be collocated with a receiver 610 in a transceiver component. For example, the transmitter 620 may be an example of aspects of the transceiver 920 described with reference to FIG. 9. The transmitter 620 may utilize a single antenna or a set of antennas.

Figure 7:
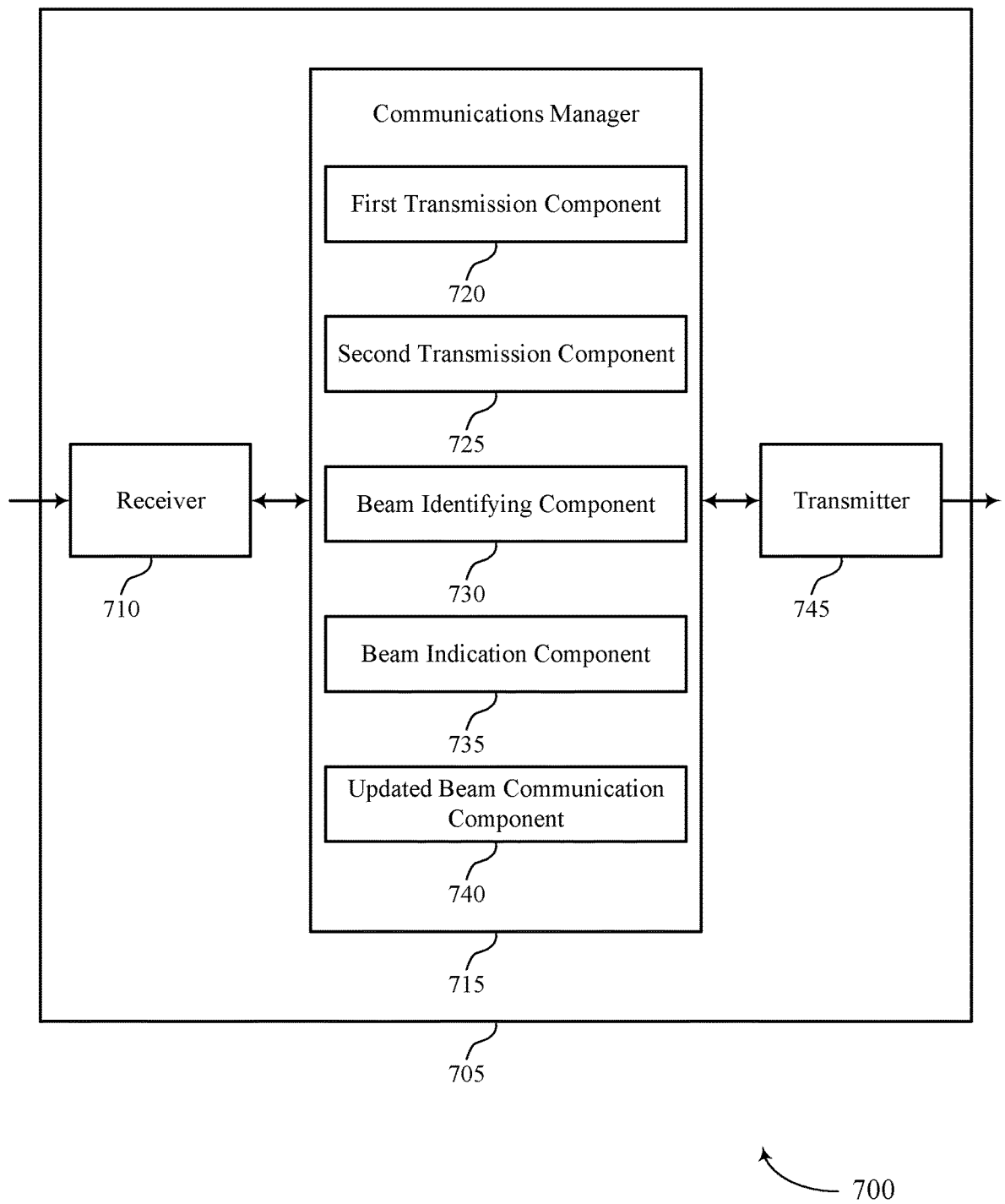

FIG. 7 shows a block diagram 700 of a device 705 that supports techniques updating beams in periodic transmissions in accordance with aspects of the present disclosure. The device 705 may be an example of aspects of a device 605, or a UE 115 as described herein. The device 705 may include a receiver 710, a communications manager 715, and a transmitter 745. The device 705 may also include a processor. Each of these components may be in communication with one another (e.g., via one or more buses).

The receiver 710 may receive information such as packets, user data, or control information associated with various information channels (e.g., control channels, data channels, and information related to techniques updating beams in periodic transmissions, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a first transmission component 720, a second transmission component 725, a beam identifying component 730, a beam indication component 735, and an updated beam communication component 740. The communications manager 715 may be an example of aspects of the communications manager 910 described herein.

The first transmission component 720 may determine a first transmission on a first set of beams is unsuccessful. The second transmission component 725 may determine a second transmission on a second set of beams is successful. The beam identifying component 730 may identify a beam from the second set of beams based on the determination that the second transmission on the second set of beams is successful. The beam indication component 735 may transmit, to a base station, an indication of the identified beam from the second set of beams. The updated beam communication component 740 may communicate with the base station via the identified beam from the second set of beams.

Based on the UE 115 measuring DMRS and identifying a new beam based on the DMRS measurements, a processor of a UE 115 (e.g., controlling the receiver 710, the transmitter 740, or the transceiver 920 as described with reference to FIG. 9) may efficiently adjust antenna arrays or other radio frequency components to monitor or transmit using the identified beam. If the signal strength on the new beam is stronger, there may be relatively less processing performed to receive and successfully decode transmissions using the new beam. This may lead to improved performance for the processor of the UE 115.

The transmitter 745 may transmit signals generated by other components of the device 705. In some examples, the transmitter 745 may be collocated with a receiver 710 in a transceiver component. For example, the transmitter 745 may be an example of aspects of the transceiver 920 described with reference to FIG. 9. The transmitter 745 may utilize a single antenna or a set of antennas.

Figure 8:
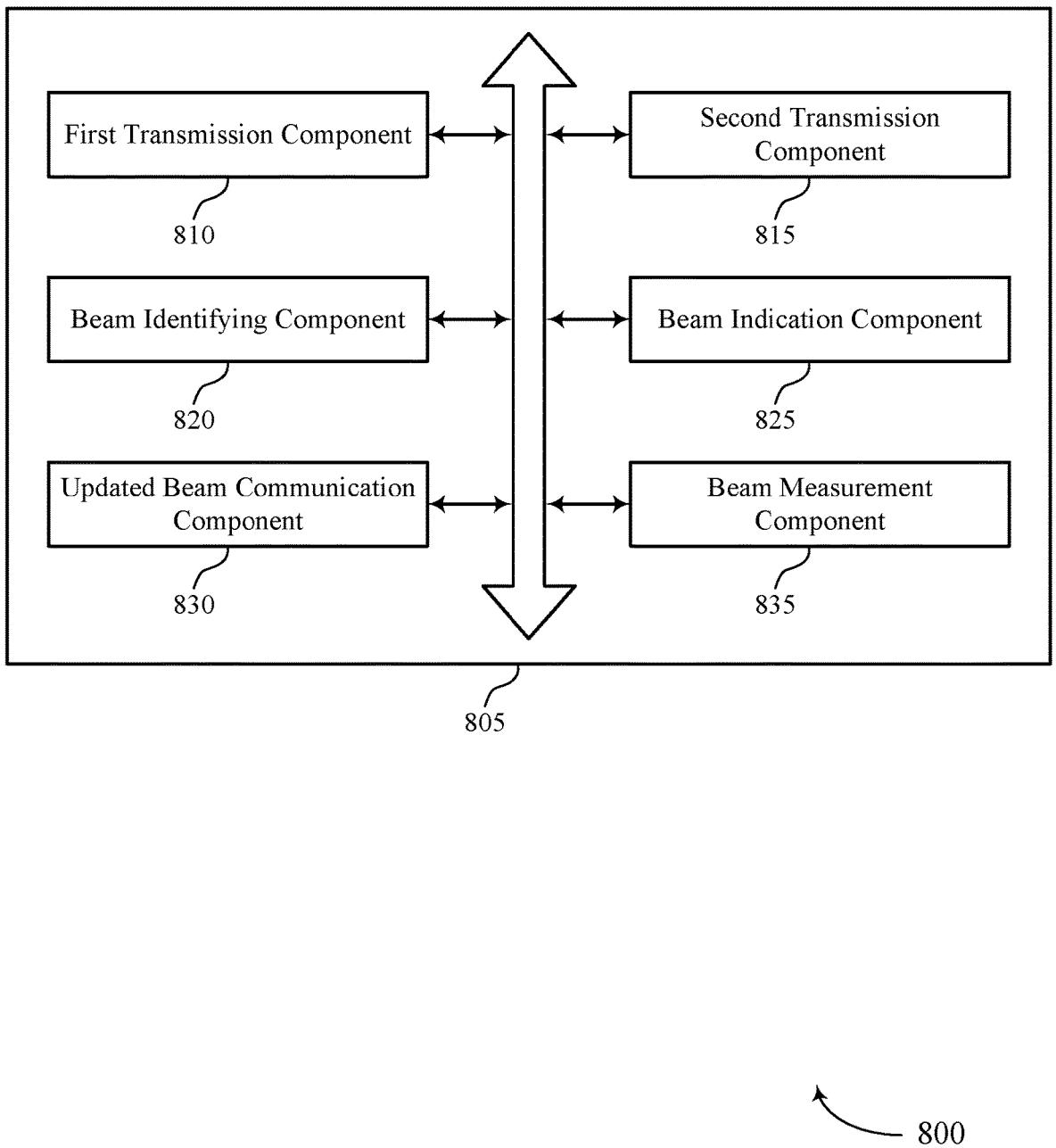
FIG. 8 shows a block diagram of a communications manager that supports techniques updating beams in periodic transmissions in accordance with aspects of the present disclosure.

FIG. 8 shows a block diagram 800 of a communications manager 805 that supports techniques updating beams in periodic transmissions in accordance with aspects of the present disclosure. The communications manager 805 may be an example of aspects of a communications manager 615, a communications manager 715, or a communications manager 910 described herein. The communications manager 805 may include a first transmission component 810, a second transmission component 815, a beam identifying component 820, a beam indication component 825, an updated beam communication component 830, and a beam measurement component 835. Each of these components may communicate, directly or indirectly, with one another (e.g., via one or more buses).

The first transmission component 810 may determine a first transmission on a first set of beams is unsuccessful. The second transmission component 815 may determine a second transmission on a second set of beams is successful. In some examples, the second transmission component 815 may communicate with the base station via the identified beam during a second data exchange cycle scheduled between the UE and the base station, where the second data exchange cycle is subsequent to the first data exchange cycle. In some cases, the first transmission and the second transmission are communicated during a first data exchange cycle scheduled between the UE and the base station. In some cases, the beam used for communications during the second data exchange cycle is identified based on a latest transmitted indication of a set of indications transmitted during the first data exchange.

The beam identifying component 820 may identify a beam from the second set of beams based on the determination that the second transmission on the second set of beams is successful. The beam indication component 825 may transmit, to a base station, an indication of the identified beam from the second set of beams. In some examples, the beam indication component 825 may transmit the indication on an uplink resource corresponding to the identified beam.

In some cases, the indication includes a bit field indicating the identified beam from the second set of beams. In some cases, the bit field indicates a TCI state for each beam of the second set of beams. In some cases, the bit field indicates a spatial relationship information identifier for each beam of the second set of beams. In some cases, the indication indicates a beam sweep pattern for the second data exchange cycle, the beam sweep pattern including at least the second set of beams, where the second transmission is communicated on each beam of the beam sweep pattern.

The updated beam communication component 830 may communicate with the base station via the identified beam from the second set of beams. In some examples, the updated beam communication component 830 may receive a PDSCH transmission from the base station on the identified beam. In some examples, the updated beam communication component 830 may transmit a PUSCH transmission to the base station on the identified beam. In some examples, the updated beam communication component 830 may communicate a third transmission on the identified beam, where the first transmission is configured according to a first periodic communication configuration, and the third transmission is configured according to a second periodic communication configuration.

In some examples, the updated beam communication component 830 may communicate a third transmission on the identified beam, where the third transmission is in an opposite transmission direction from the first transmission. In some examples, the updated beam communication component 830 may receive an indication from the base station to use the identified beam for the third transmission. In some cases, the first transmission is a downlink periodic transmission, and the second transmission is a retransmission of the first transmission. In some cases, the indication is transmitted with an acknowledgment or negative acknowledgment for the second transmission. In some cases, the first transmission and the communicating are configured according to an SPS configuration. In some cases, the first transmission is an uplink transmission, the second transmission is a downlink transmission carrying a DMRS, and the indication is transmitted with a retransmission of the first transmission. In some cases, the first transmission and the communicating are configured according to a CG configuration.

The beam measurement component 835 may measure a DMRS in the second transmission for each beam from the second set of beams, where the beam is identified based on the measuring.

Figure 9:
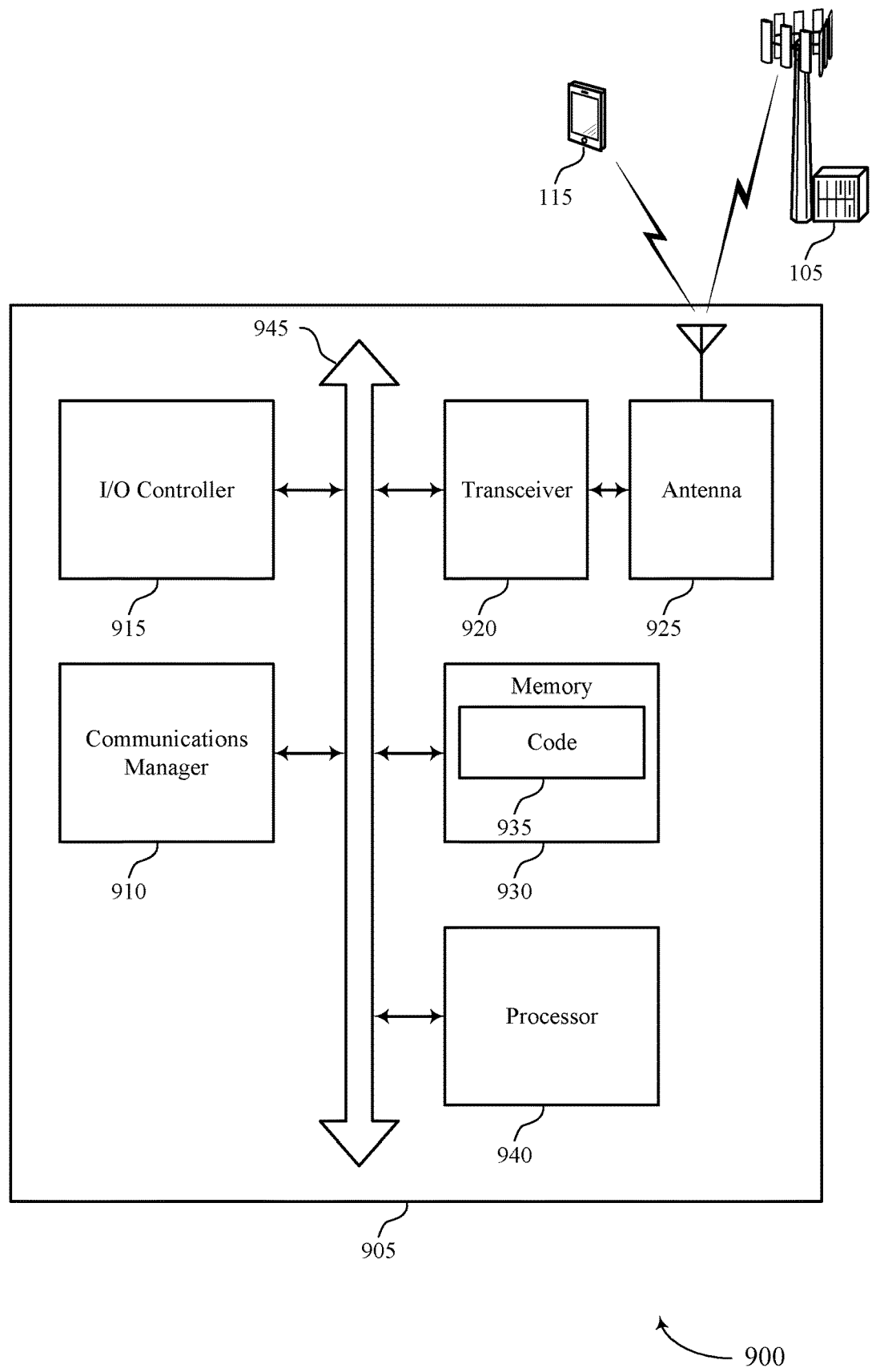
FIG. 9 shows a diagram of a system including a device that supports techniques updating beams in periodic transmissions in accordance with aspects of the present disclosure.

FIG. 9 shows a diagram of a system 900 including a device 905 that supports techniques updating beams in periodic transmissions in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may determine a first transmission on a first set of beams is unsuccessful, determine a second transmission on a second set of beams is successful, identify a beam from the second set of beams based on the determination that the second transmission on the second set of beams is successful, transmit, to a base station, an indication of the identified beam from the second set of beams, and communicate with the base station via the identified beam from the second set of beams.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques updating beams in periodic transmissions).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
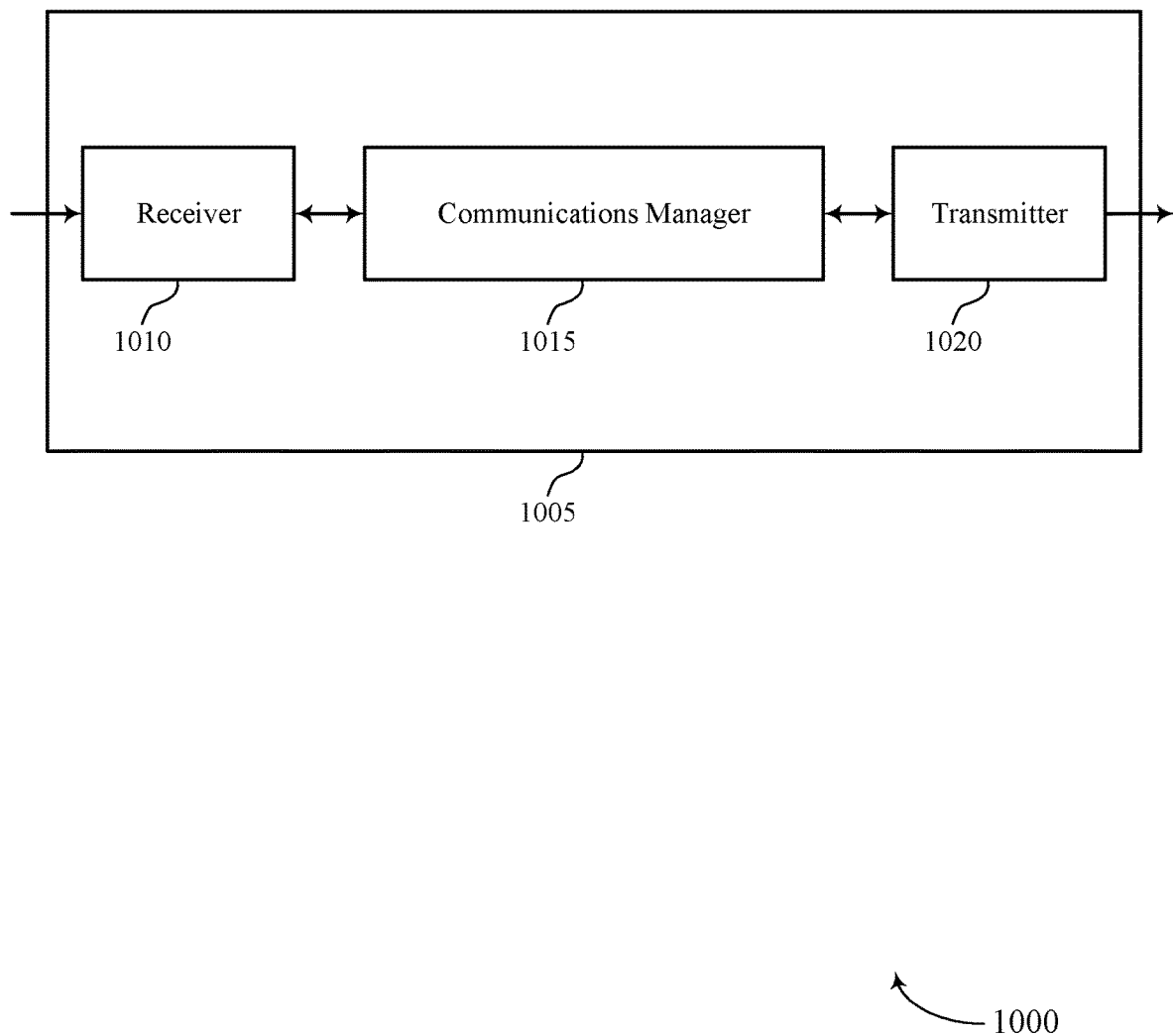
FIGS. 10 and 11 show block diagrams of devices that support techniques updating beams in periodic transmissions in accordance with aspects of the present disclosure.

FIG. 10 shows a block diagram 1000 of a device 1005 that supports techniques updating beams in periodic transmissions in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to techniques updating beams in periodic transmissions, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may determine a first transmission on a first set of beams is unsuccessful, determine a second transmission on a second set of beams is successful, receive, from a UE, an indication of a beam from the second set of beams, and communicate with the UE via the indicated beam. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver component. For example, the transmitter 1020 may be an example of aspects of the transceiver 1320 described with reference to FIG. 13. The transmitter 1020 may utilize a single antenna or a set of antennas.

Figure 11:
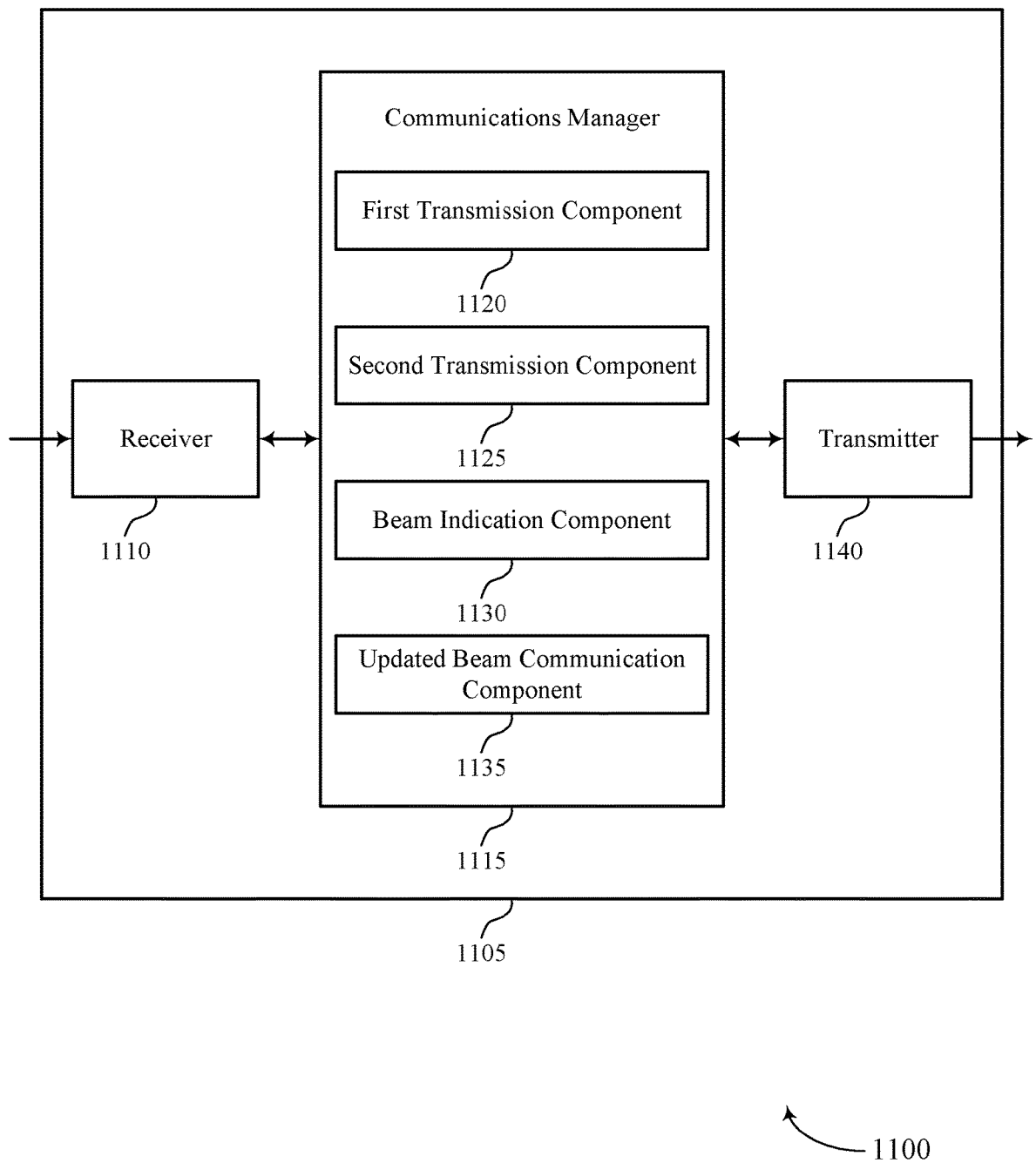

FIG. 11 shows a block diagram 1100 of a device 1105 that supports techniques updating beams in periodic transmissions in accordance with aspects of the present disclosure. The device 1105 may be an example of aspects of a device 1005, or a base station 105 as described herein. The device 1105 may include a receiver 1110, a communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to techniques updating beams in periodic transmissions, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a first transmission component 1120, a second transmission component 1125, a beam indication component 1130, and an updated beam communication component 1135. The communications manager 1115 may be an example of aspects of the communications manager 1310 described herein.

The first transmission component 1120 may determine a first transmission on a first set of beams is unsuccessful. The second transmission component 1125 may determine a second transmission on a second set of beams is successful. The beam indication component 1130 may receive, from a UE, an indication of a beam from the second set of beams. The updated beam communication component 1135 may communicate with the UE via the indicated beam.

The transmitter 1140 may transmit signals generated by other components of the device 1105. In some examples, the transmitter 1140 may be collocated with a receiver 1110 in a transceiver component. For example, the transmitter 1140 may be an example of aspects of the transceiver 1320 described with reference to FIG. 13. The transmitter 1140 may utilize a single antenna or a set of antennas.

Figure 12:
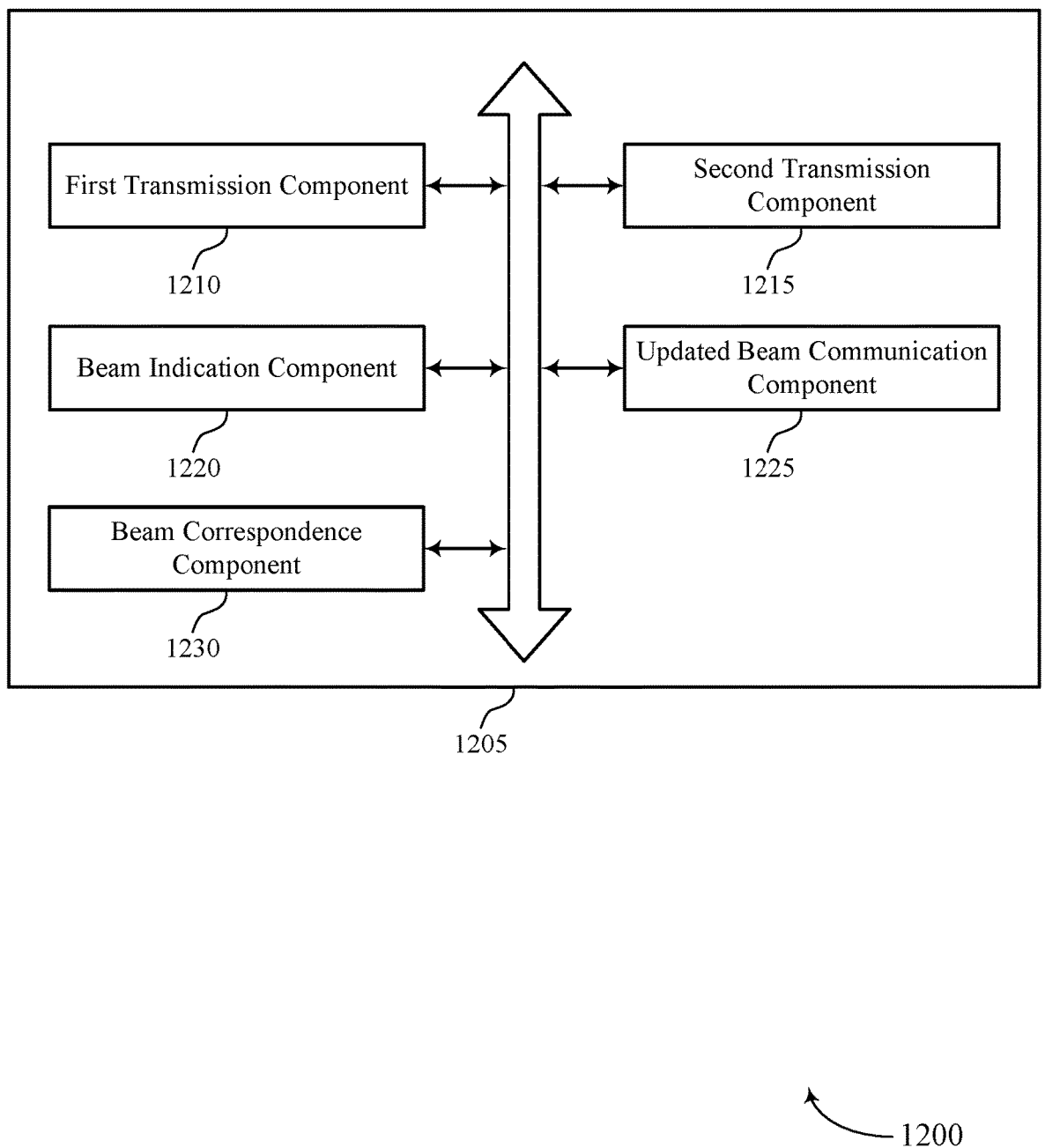
FIG. 12 shows a block diagram of a communications manager that supports techniques updating beams in periodic transmissions in accordance with aspects of the present disclosure.

FIG. 12 shows a block diagram 1200 of a communications manager 1205 that supports techniques updating beams in periodic transmissions in accordance with aspects of the present disclosure. The communications manager 1205 may be an example of aspects of a communications manager 1015, a communications manager 1115, or a communications manager 1310 described herein. The communications manager 1205 may include a first transmission component 1210, a second transmission component 1215, a beam indication component 1220, and an updated beam communication component 1225. Each of these components may communicate, directly or indirectly, with one another (e.g., via one or more buses).

The first transmission component 1210 may determine a first transmission on a first set of beams is unsuccessful. The second transmission component 1215 may determine a second transmission on a second set of beams is successful. In some examples, the second transmission component 1215 may communicate with the UE via the indicated beam during a second data exchange cycle scheduled between the UE and the base station, where the second data exchange cycle is subsequent to the first data exchange cycle. In some cases, the first transmission and the second transmission are communicated during a data exchange cycle scheduled between the UE and the base station. In some cases, the beam used for communications during the second data exchange cycle is identified based on a latest transmitted indication of a set of indications transmitted during the first data exchange.

The beam indication component 1220 may receive, from a UE, an indication of a beam from the second set of beams. In some examples, the beam indication component 1220 may receive the indication on an uplink resource corresponding to the indicated beam. In some cases, the indication includes a bit field indicating the indicated beam from the second set of beams. In some cases, the bit field indicates a TCI state for each beam of the second set of beams. In some cases, the bit field indicates a spatial relationship information identifier for each beam of the second set of beams. In some cases, the indication indicates a beam sweep pattern for the second data exchange cycle, the beam sweep pattern including at least the second set of beams, where the second transmission is communicated on each beam of the beam sweep pattern.

The updated beam communication component 1225 may communicate with the UE via the indicated beam. In some examples, the updated beam communication component 1225 may transmit a PDSCH transmission to the UE on the indicated beam. In some examples, the updated beam communication component 1225 may receive a PUSCH transmission from the UE on the indicated beam.

In some examples, the updated beam communication component 1225 may communicate a third transmission on the indicated beam, where the first transmission is configured according to a first periodic communication configuration, and the third transmission is configured according to a second periodic communication configuration. In some examples, the updated beam communication component 1225 may communicate a third transmission on the indicated beam, where the third transmission is in an opposite transmission direction from the first transmission. In some examples, the updated beam communication component 1225 may transmit an indication to the UE to use the indicated beam for the third transmission. In some cases, the first transmission is a downlink periodic transmission, and the second transmission is a retransmission of the first transmission.

In some cases, the indication is received with an acknowledgment or negative acknowledgment for the second transmission. In some cases, the first transmission and the communicating are configured according to an SPS configuration. In some cases, the first transmission is an uplink transmission, the second transmission is a downlink transmission carrying a DMRS, and the indication is received with a retransmission of the first transmission. In some cases, the first transmission and the communicating are configured according to a CG configuration.

In some examples, the beam correspondence component 1230 may communicate a third transmission on the indicated beam, where the third transmission is in an opposite transmission direction from the first transmission. In some examples, the beam correspondence component 1230 may transmit an indication to the UE to use the indicated beam for the third transmission.

Figure 13:
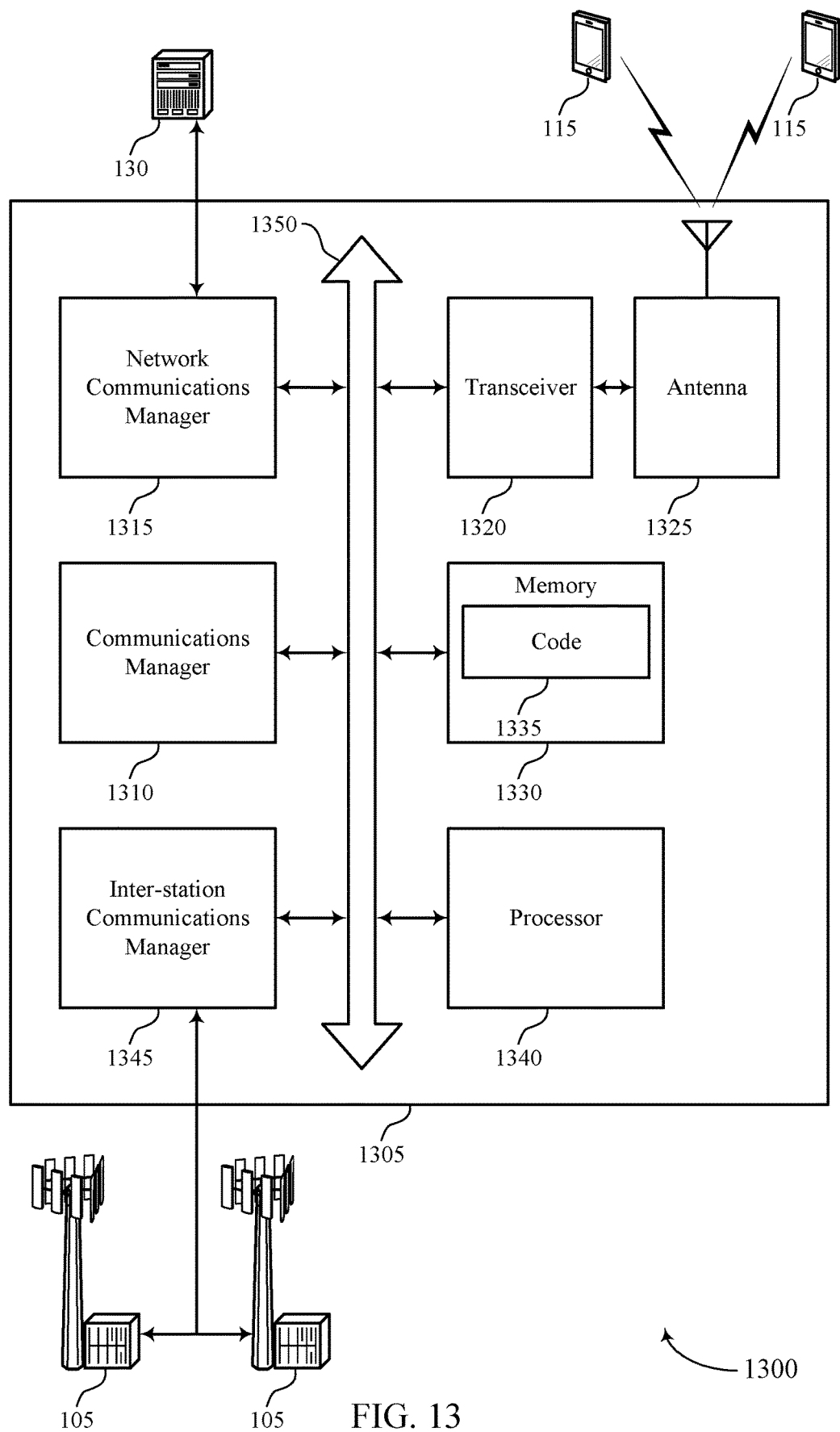
FIG. 13 shows a diagram of a system including a device that supports techniques updating beams in periodic transmissions in accordance with aspects of the present disclosure.

FIG. 13 shows a diagram of a system 1300 including a device 1305 that supports techniques updating beams in periodic transmissions in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may determine a first transmission on a first set of beams is unsuccessful, determine a second transmission on a second set of beams is successful, receive, from a UE, an indication of a beam from the second set of beams, and communicate with the UE via the indicated beam.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting techniques updating beams in periodic transmissions).

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
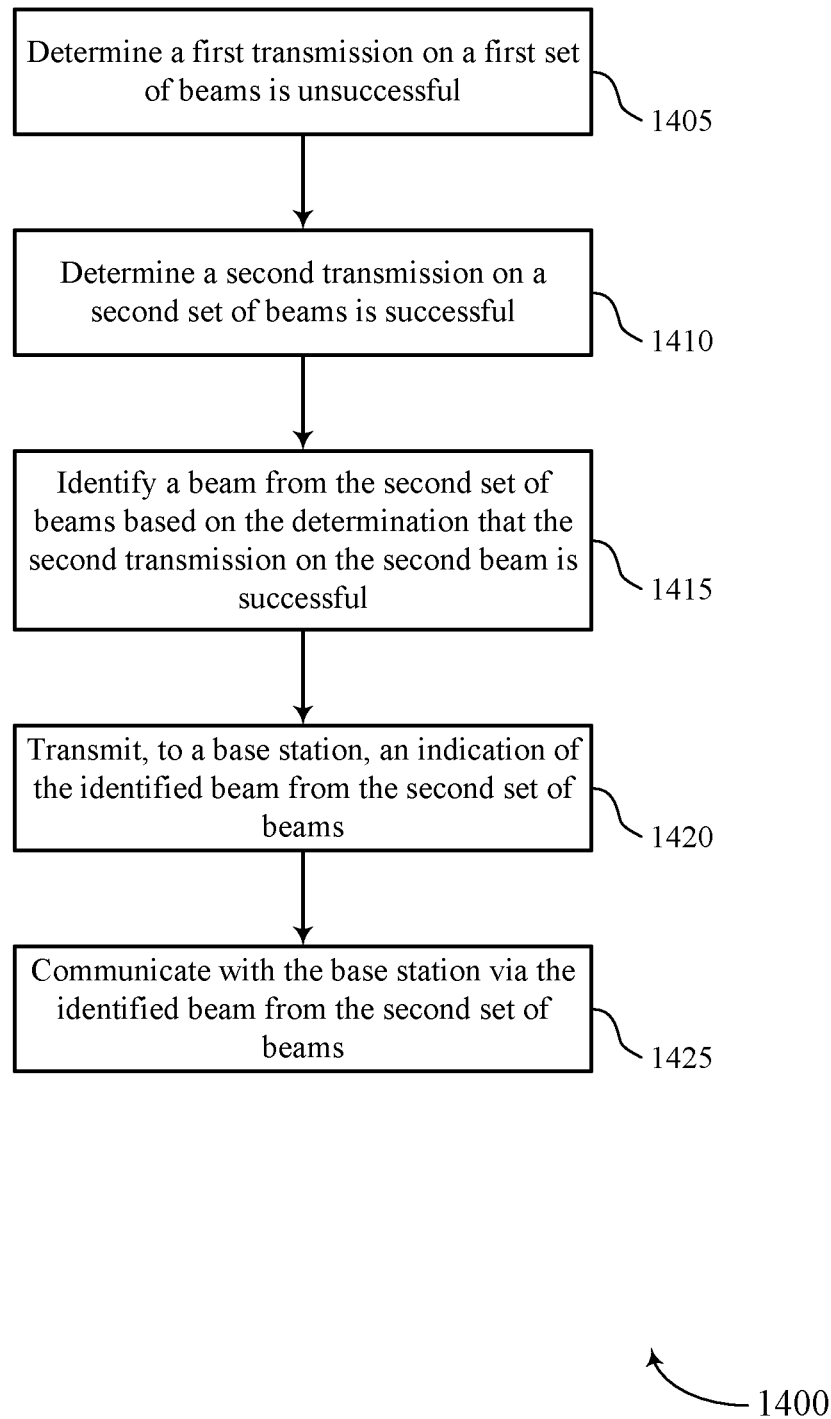
FIGS. 14 through 16 show flowcharts illustrating methods that support techniques updating beams in periodic transmissions in accordance with aspects of the present disclosure.

FIG. 14 shows a flowchart illustrating a method 1400 that supports techniques updating beams in periodic transmissions in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may determine a first transmission on a first set of beams is unsuccessful. The operations of 1405 may be performed according to the methods described herein. In some examples, aspects of the operations of 1405 may be performed by a first transmission component as described with reference to FIGS. 6 through 9.

At 1410, the UE may determine a second transmission on a second set of beams is successful. The operations of 1410 may be performed according to the methods described herein. In some examples, aspects of the operations of 1410 may be performed by a second transmission component as described with reference to FIGS. 6 through 9.

At 1415, the UE may identify a beam from the second set of beams based on the determination that the second transmission on the second set of beams is successful. The operations of 1415 may be performed according to the methods described herein. In some examples, aspects of the operations of 1415 may be performed by a beam identifying component as described with reference to FIGS. 6 through 9.

At 1420, the UE may transmit, to a base station, an indication of the identified beam from the second set of beams. The operations of 1420 may be performed according to the methods described herein. In some examples, aspects of the operations of 1420 may be performed by a beam indication component as described with reference to FIGS. 6 through 9.

At 1425, the UE may communicate with the base station via the identified beam from the second set of beams. The operations of 1425 may be performed according to the methods described herein. In some examples, aspects of the operations of 1425 may be performed by an updated beam communication component as described with reference to FIGS. 6 through 9.

Figure 15:
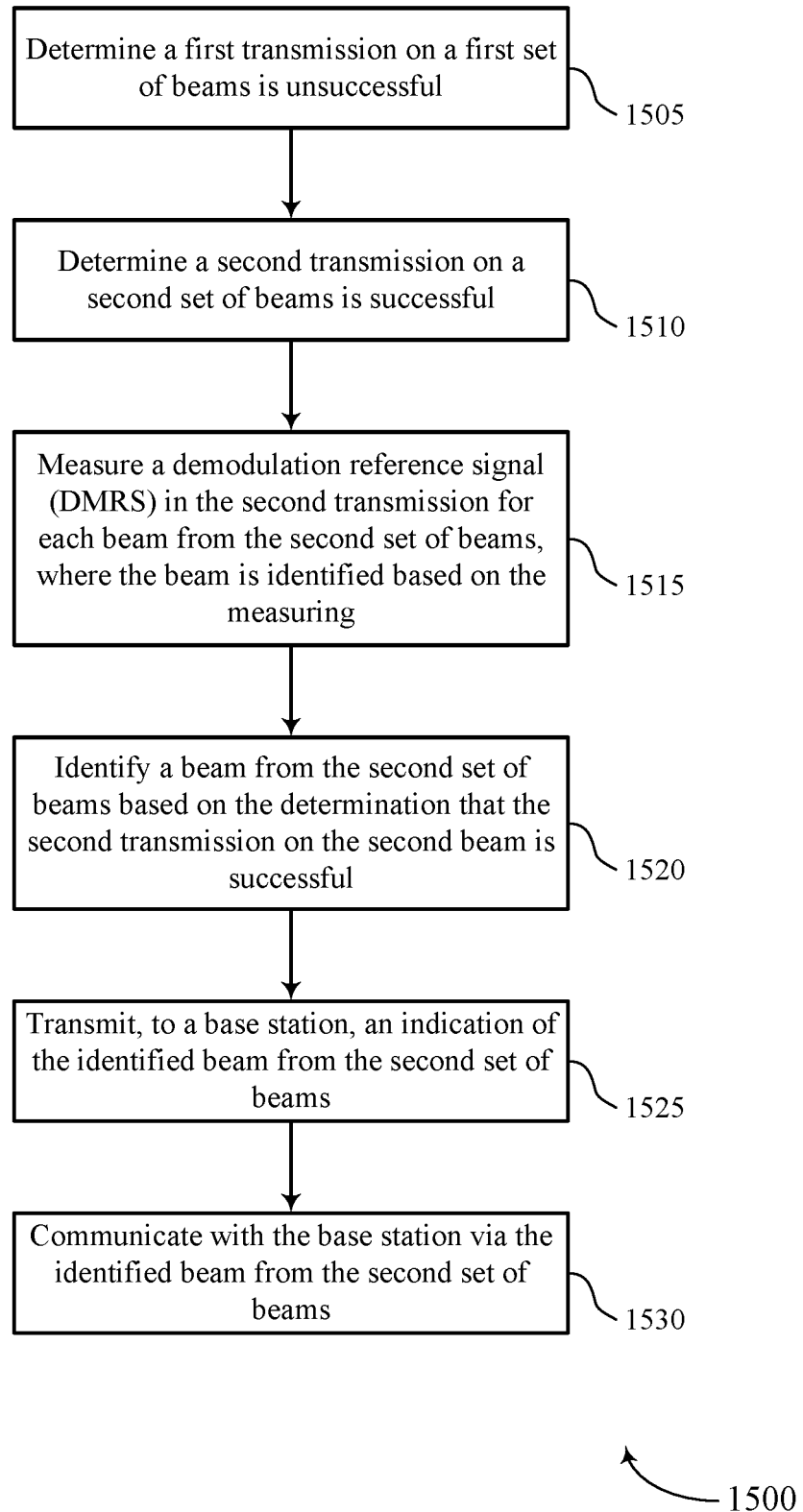

FIG. 15 shows a flowchart illustrating a method 1500 that supports techniques updating beams in periodic transmissions in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may determine a first transmission on a first set of beams is unsuccessful. The operations of 1505 may be performed according to the methods described herein. In some examples, aspects of the operations of 1505 may be performed by a first transmission component as described with reference to FIGS. 6 through 9.

At 1510, the UE may determine a second transmission on a second set of beams is successful. The operations of 1510 may be performed according to the methods described herein. In some examples, aspects of the operations of 1510 may be performed by a second transmission component as described with reference to FIGS. 6 through 9.

At 1515, the UE may measure a demodulation reference signal (DMRS) in the second transmission for each beam from the second set of beams, where the beam is identified based on the measuring. The operations of 1515 may be performed according to the methods described herein. In some examples, aspects of the operations of 1515 may be performed by a beam measurement component as described with reference to FIGS. 6 through 9.

At 1520, the UE may identify a beam from the second set of beams based on the determination that the second transmission on the second set of beams is successful. The operations of 1520 may be performed according to the methods described herein. In some examples, aspects of the operations of 1520 may be performed by a beam identifying component as described with reference to FIGS. 6 through 9.

At 1525, the UE may transmit, to a base station, an indication of the identified beam from the second set of beams. The operations of 1525 may be performed according to the methods described herein. In some examples, aspects of the operations of 1525 may be performed by a beam indication component as described with reference to FIGS. 6 through 9.

At 1530, the UE may communicate with the base station via the identified beam from the second set of beams. The operations of 1530 may be performed according to the methods described herein. In some examples, aspects of the operations of 1530 may be performed by an updated beam communication component as described with reference to FIGS. 6 through 9.

Figure 16:
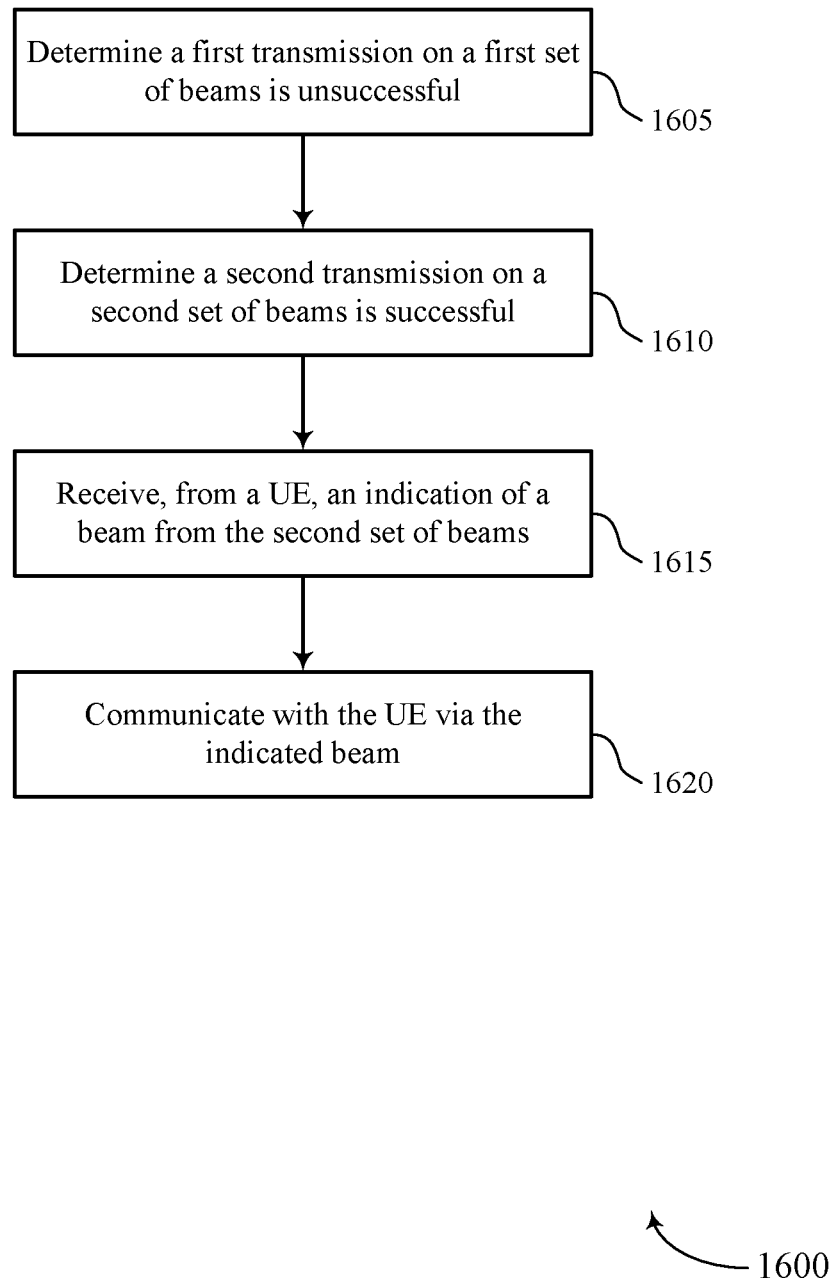

FIG. 16 shows a flowchart illustrating a method 1600 that supports techniques updating beams in periodic transmissions in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1605, the base station may determine a first transmission on a first set of beams is unsuccessful. The operations of 1605 may be performed according to the methods described herein. In some examples, aspects of the operations of 1605 may be performed by a first transmission component as described with reference to FIGS. 10 through 13.

At 1610, the base station may determine a second transmission on a second set of beams is successful. The operations of 1610 may be performed according to the methods described herein. In some examples, aspects of the operations of 1610 may be performed by a second transmission component as described with reference to FIGS. 10 through 13.

At 1615, the base station may receive, from a UE, an indication of a beam from the second set of beams. The operations of 1615 may be performed according to the methods described herein. In some examples, aspects of the operations of 1615 may be performed by a beam indication component as described with reference to FIGS. 10 through 13.

At 1620, the base station may communicate with the UE via the indicated beam. The operations of 1620 may be performed according to the methods described herein. In some examples, aspects of the operations of 1620 may be performed by an updated beam communication component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell may cover a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or PUCCH or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   determining a first data transmission on a first set of beams during an initial transmission period of a first data exchange cycle is unsuccessful, wherein the first data exchange cycle is scheduled between the UE and the network device;
   determining a second data transmission on a second set of beams during a retransmission period of the first data exchange cycle is successful;
   identifying a beam from the second set of beams based at least in part on the determination that the second data transmission on the second set of beams is successful;
   transmitting, to the network device during the retransmission period of the first data exchange cycle, at least one of a feedback message comprising a first indication that the second data transmission was received successfully and a second indication of the identified beam from the second set of beams or a retransmission of the first data transmission comprising the second indication of the identified beam from the second set of beams; and
   communicating with the network device via the identified beam from the second set of beams during a second data exchange cycle scheduled between the UE and the network device, wherein the second data exchange cycle is subsequent to the first data exchange cycle.

2. The method of claim 1, wherein the beam used for communications during the second data exchange cycle is identified based at least in part on a latest transmitted indication of a plurality of indications transmitted during the first data exchange cycle.

3. The method of claim 1, further comprising:
   measuring a demodulation reference signal (DMRS) in the second data transmission for each beam from the second set of beams, wherein the beam is identified based at least in part on the measuring.

4. The method of claim 1, wherein communicating via the indicated beam comprises:
   receiving a physical downlink shared channel (PDSCH) transmission from the network device on the identified beam.

5. The method of claim 4, wherein the first data transmission is a downlink periodic transmission, and the second data transmission is the retransmission of the first data transmission.

6. The method of claim 4, wherein the first indication is transmitted with an acknowledgment or negative acknowledgment for the second data transmission.

7. The method of claim 4, wherein the first data transmission and the communicating are configured according to a semi-persistent scheduling (SPS) configuration.

8. The method of claim 1, wherein communicating via the indicated beam comprises:
   transmitting a physical uplink shared channel (PUSCH) transmission to the network device on the identified beam, wherein the first data transmission is an uplink transmission, the second data transmission is a downlink transmission carrying a demodulation reference signal (DMRS), and the second indication is transmitted with the retransmission of the first data transmission.

9. The method of claim 8, wherein the first data transmission and the communicating are configured according to a configured grant (CG) configuration.

10. The method of claim 1, wherein the second indication indicates a beam sweep pattern, the beam sweep pattern comprising at least the second set of beams, wherein the second data transmission is communicated on each beam of the beam sweep pattern.

11. The method of claim 1, further comprising:
    communicating a third data transmission on the identified beam, wherein the third data transmission is in an opposite transmission direction from the first data transmission.

12. The method of claim 11, further comprising:
    receiving a third indication from the network device to use the identified beam for the third data transmission.

13. The method of claim 1, further comprising:
    communicating a third data transmission on the identified beam, wherein the first data transmission is configured according to a first periodic communication configuration, and the third data transmission is configured according to a second periodic communication configuration.

14. The method of claim 1, wherein the second indication comprises a bit field indicating the identified beam from the second set of beams.

15. The method of claim 14, wherein the bit field indicates a transmission configuration indicator (TCI) state for each beam of the second set of beams, a spatial relationship information identifier for each beam of the second set of beams, or both.

16. The method of claim 1, wherein transmitting the second indication comprises:
    transmitting the second indication on an uplink resource corresponding to the identified beam.

17. A method for wireless communications at a network device, comprising:
    determining a first data transmission on a first set of beams during an initial transmission period of a first data exchange cycle is unsuccessful, wherein the first data exchange cycle is scheduled between a user equipment (UE) and the network device;
    determining a second data transmission on a second set of beams during a retransmission period of the first data exchange cycle is successful;
    receiving, from the UE during the retransmission period of the first data exchange cycle, at least one of a feedback message comprising a first indication that the second data transmission was received successfully and a second indication of a beam from the second set of beams or a retransmission of the first data transmission comprising the second indication of the beam from the second set of beams; and
    communicating via the indicated beam during a second data exchange cycle scheduled between the UE and the network device, wherein the second data exchange cycle is subsequent to the first data exchange cycle.

18. The method of claim 17, wherein the communicating further comprises:
    communicating via the indicated beam during the second data exchange cycle scheduled between the UE and the network device, wherein the beam used for communications during the second data exchange cycle is identified based at least in part on a latest transmitted indication of a plurality of indications transmitted during the first data exchange cycle.

19. The method of claim 17, wherein communicating via the indicated beam comprises:
transmitting a physical downlink shared channel (PDSCH) transmission on the indicated beam, wherein the first data transmission is a downlink periodic transmission, and the second data transmission is the retransmission of the first data transmission.

20. The method of claim 17, wherein communicating via the indicated beam comprises:
receiving a physical uplink shared channel (PUSCH) transmission on the indicated beam.

21. The method of claim 17, wherein the second indication indicates a beam sweep pattern, the beam sweep pattern comprising at least the second set of beams, wherein the second data transmission is communicated on each beam of the beam sweep pattern.

22. The method of claim 17, further comprising:
communicating a third data transmission on the indicated beam, wherein the first data transmission is configured according to a first periodic communication configuration, and the third data transmission is configured according to a second periodic communication configuration.

23. The method of claim 17, further comprising:
communicating a third data transmission on the indicated beam, wherein the third data transmission is in an opposite transmission direction from the first data transmission; and
transmitting a third indication to use the indicated beam for the third data transmission.

24. The method of claim 17, wherein the second indication comprises a bit field indicating the indicated beam from the second set of beams.

25. The method of claim 17, wherein receiving the second indication comprises:
receiving the second indication on an uplink resource corresponding to the indicated beam.

26. An apparatus for wireless communications at a user equipment (UE), comprising: a processor, memory coupled with the processor; and instructions stored in the memory and executable by the processor to cause the apparatus to:
determine a first data transmission on a first set of beams during an initial transmission period of a first exchange cycle is unsuccessful, wherein the first data exchange cycle is scheduled between the UE and a network device;
determine a second data transmission on a second set of beams during a retransmission period of the first data exchange cycle is successful;
identify a beam from the second set of beams based at least in part on the determination that the second data transmission on the second set of beams is successful;
transmit, to the network device during the retransmission period of the first data exchange cycle, at least one of a feedback message comprising a first indication that the second data transmission was received successfully and a second indication of the identified beam from the second set of beams or a retransmission of the first data transmission comprising the second indication of the identified beam from the second set of beams; and
communicate with the network device via the identified beam from the second set of beams during a second data exchange cycle scheduled between the UE and the network device, wherein the second data exchange cycle is subsequent to the first data exchange cycle.

27. An apparatus for wireless communications at a network device, comprising: a processor, memory coupled with the processor; and instructions stored in the memory and executable by the processor to cause the apparatus to:
determine a first data transmission on a first set of beams during an initial retransmission period of a first data exchange cycle is unsuccessful, wherein the first data exchange cycle is scheduled between a user equipment (UE) and the network device;
determine a second data transmission on a second set of beams during a retransmission period of the first data exchange cycle is successful;
receive, from the UE during the retransmission period of the first data exchange cycle, at least one of a feedback message comprising a first indication that the second data transmission was received successfully and a second indication of a beam from the second set of beams or a retransmission of the first data transmission comprising the second indication of the beam from the second set of beams; and
communicate via the indicated beam during a second data exchange cycle scheduled between the UE and the network device, wherein the second data exchange cycle is subsequent to the first data exchange cycle.

* * * * *